(12) United States Patent
Misumi et al.

(10) Patent No.: US 12,270,410 B2
(45) Date of Patent: Apr. 8, 2025

(54) SURFACE-PROCESSED STRUCTURE, SURFACE-PROCESSED SHEET, AND PROPELLER FAN

(71) Applicant: SHARP KABUSHIKI KAISHA, Sakai (JP)

(72) Inventors: Masaru Misumi, Sakai (JP); Yui Kumon, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/287,003

(22) PCT Filed: Mar. 22, 2022

(86) PCT No.: PCT/JP2022/013011
§ 371 (c)(1),
(2) Date: Oct. 14, 2023

(87) PCT Pub. No.: WO2022/220021
PCT Pub. Date: Oct. 20, 2022

(65) Prior Publication Data
US 2024/0200570 A1 Jun. 20, 2024

(30) Foreign Application Priority Data

Apr. 16, 2021 (JP) .................................. 2021-069498
Feb. 9, 2022 (JP) .................................. 2022-018395

(51) Int. Cl.
*F04D 29/38* (2006.01)

(52) U.S. Cl.
CPC ........ *F04D 29/384* (2013.01); *F05D 2240/30* (2013.01); *F05D 2240/303* (2013.01)

(58) Field of Classification Search
CPC ........... F05D 2240/30; F05D 2240/305; F05D 2240/303; F04D 29/384; B64C 21/10; F01D 5/14; F01D 5/141
See application file for complete search history.

(56) References Cited

U.S. PATENT DOCUMENTS 5,114,099 A 5/1992 Gao
5,848,769 A 12/1998 Fronek et al.
(Continued)

FOREIGN PATENT DOCUMENTS

AU 2019101286 A4 12/2019
DE 20114878 U1 3/2002
(Continued)

OTHER PUBLICATIONS

Machine translation of JP2020-117862A, retrieved from ESPACENET on Mar. 23, 2024 (Year: 2024).

*Primary Examiner* — Courtney D Heinle
*Assistant Examiner* — Andrew Thanh Bui
(74) *Attorney, Agent, or Firm* — ScienBiziP, P.C.

(57) ABSTRACT

A surface-processed structure includes a plurality of blocks that are three-dimensional objects arranged on a target surface. The plurality of blocks are spaced apart from each other and are arranged side by side in a second direction. Each of the plurality of blocks includes a top face including a plurality of fine grooves. The plurality of fine grooves are spaced apart from each other, are arranged side by side in the second direction, and extend from upstream to downstream in a first direction. A width of each of the plurality of fine grooves in the second direction is less than a width of a block clearance in the second direction. Both end portions of the top face in the second direction are located above bottoms of the plurality of fine grooves in a cross section of the block extending along a plane perpendicular to the first direction.

11 Claims, 35 Drawing Sheets

(56) References Cited

U.S. PATENT DOCUMENTS

| | | | |
|---|---|---|---|
| 11,614,106 B2 | 3/2023 | Smith et al. | |
| 11,933,193 B2 * | 3/2024 | Patil | F01D 5/145 |
| 2009/0092498 A1 | 4/2009 | Jabado et al. | |
| 2010/0159204 A1 | 6/2010 | Van Merksteijn | |
| 2012/0325326 A1 | 12/2012 | Mei | |
| 2019/0101002 A1 | 4/2019 | Duffin et al. | |
| 2020/0263704 A1 | 8/2020 | Miyazaki et al. | |
| 2023/0134254 A1 | 5/2023 | Sato | |

FOREIGN PATENT DOCUMENTS

| | | |
|---|---|---|
| EP | 1808508 A1 | 7/2007 |
| GB | 379747 A | 9/1932 |
| JP | 2001-050215 A | 2/2001 |
| JP | 2002039118 A | 2/2002 |
| JP | 2003-003945 A | 1/2003 |
| JP | 2009-504474 A | 2/2009 |
| JP | 2010-007846 A | 1/2010 |
| JP | 2013-002636 A | 1/2013 |
| JP | 2020-117862 A | 8/2020 |
| WO | 03020584 A1 | 3/2003 |
| WO | 2018/139049 A1 | 8/2018 |
| WO | 2021214900 A1 | 10/2021 |

* cited by examiner

| EXAMPLE 1 | TARGET FLOW | WIND VELOCITY (m/s) | TARGET VALUE OF PITCH P (μm) |
|---|---|---|---|
| ○ | FAN MODE: STRONG | 15 | 15 TO 30 |
| × | FAN MODE: MEDIUM | 10 | 22 TO 45 |
| ○ | FAN MODE: WEAK | 4 | 56 TO 112 |

FIG. 10B

| EXAMPLE 1 | PITCH P (μm) | GROOVE WIDTH W (μm) | GROOVE SPACING G (μm) | GROOVE ASPECT RATIO (UPSTREAM -> DOWNSTREAM) | GROOVE SHAPE |
|---|---|---|---|---|---|
| FINE GROOVE | 15 | 10 | 5 | 0.5 | RECTANGLE |
| BLOCK CLEARANCE | 112 | 32 | 80 | 0.3 → 1.85 | RECTANGLE |

FIG. 10C

| EXAMPLES 2 AND 3 | TARGET FLOW | WIND VELOCITY (m/s) | TARGET VALUE OF PITCH P (μm) |
|---|---|---|---|
| ○ | FAN MODE: STRONG | 15 | 15 TO 30 |
| ○ | FAN MODE: MEDIUM | 10 | 22 TO 45 |
| × | FAN MODE: WEAK | 4 | 56 TO 112 |

FIG. 11B

| EXAMPLES 2 AND 3 | PITCH P (μm) | GROOVE WIDTH W (μm) | GROOVE SPACING G (μm) | GROOVE ASPECT RATIO (UPSTREAM -> DOWNSTREAM) | GROOVE SHAPE |
|---|---|---|---|---|---|
| FINE GROOVE | 15 | 10 | 5 | 0.5 | RECTANGLE (EXAMPLE 2) V SHAPE (EXAMPLE 3) |
| BLOCK CLEARANCE | 100 | 20 | 80 | 0.5 → 2.2 | RECTANGLE (EXAMPLE 2) V SHAPE (EXAMPLE 3) |

FIG. 11C

SURFACE-PROCESSED STRUCTURE, SURFACE-PROCESSED SHEET, AND PROPELLER FAN

TECHNICAL FIELD

The disclosure relates to a surface-processed structure, a surface-processed sheet, and a propeller fan. The present application claims priority from JP 2021-69498 filed in Japan on Apr. 16, 2021 and JP 2022-18395 filed on Feb. 9, 2022, the content of which is hereby incorporated by reference into this application.

BACKGROUND ART

In recent years, a technology for mimicking and utilizing various functions of organisms which is so-called biomimetics has gained attention. In addition, Nature Technology (trade name) is known as an example of manufacturing that employs such a biomimetic technology in electrical products and the like.

Dimple processing is known as a method for processing surfaces of rotatable blades. In a device that uses blades rotating by receiving a fluid such as wind or running water, such as a power generator exemplified in PTL 1, dimples are provided on the rotating blades to increase the surface area of the blades and strengthen the wind resistance, thereby improving the rotation of the blades.

CITATION LIST

Patent Literature

PTL 1: JP 2003-3945 A

SUMMARY OF INVENTION

Technical Problem

Unfortunately, in a device such as a blower or a fan in which a fluid is moved by rotation of the blades receiving power from a prime mover, if dimples are provided on the rotating blades, the fluid may not be efficiently moved. Specifically, the dimples increase the surface area of the blades and strengthen the resistance of the fluid, which increases the rotational load on the blades and may hinder smooth rotation of the blades. In addition, the dimples may cause turbulence on the surface of the blades when the blades are rotating, and the turbulence may hinder the fluid from moving in a certain direction.

An object of an aspect of the disclosure is to provide a surface-processed structure, a surface-processed sheet, and a propeller fan which enable a fluid to efficiently move. Furthermore, since an aspect of the disclosure includes a technical idea focusing on the structures of butterfly scales and fish scales, it relates to biomimetics.

Solution to Problem

A surface-processed structure according to an aspect of the disclosure includes a plurality of blocks, the plurality of blocks being three-dimensional objects arranged on a target surface, the target surface being a surface of a target object. The target surface extends in a first direction and a second direction orthogonal to each other. The plurality of blocks are spaced apart from each other and are arranged side by side in the second direction. Each of the plurality of blocks includes a top face including a plurality of fine grooves. The plurality of fine grooves are spaced apart from each other, are arranged side by side in the second direction, and extend from upstream to downstream in the first direction. A block clearance having a groove shape and extending in the first direction is formed between two blocks of the plurality of blocks adjacent to each other in the second direction. A width of each of the plurality of fine grooves in the second direction is less than a width of the block clearance in the second direction. Both end portions of the top face in the second direction are located above bottoms of the plurality of fine grooves in a cross section of each of the plurality of blocks extending along a plane perpendicular to the first direction.

A surface-processed sheet according to an aspect of the disclosure includes the surface-processed structure being provided on a base of the surface-processed sheet that can be installed on the target surface.

A propeller fan according to an aspect of the disclosure includes a rotation shaft portion and a blade extending outward from the rotation shaft portion. The surface-processed structure is provided on a surface of the blade. The first direction is a direction from a leading edge toward a trailing edge of the blade.

BRIEF DESCRIPTION OF DRAWINGS

FIG. 10B is a table showing a relationship between a surface-processed sheet and target flows according to Example 1.

FIG. 10C is a table showing dimensions of the surface-processed sheet according to Example 1.

FIG. 11B is a table showing a relationship between a surface-processed sheet and a target flow according to Examples 2 and 3.

FIG. 11C is a table showing dimensions of the surface-processed sheet according to Examples 2 and 3.

DESCRIPTION OF EMBODIMENTS

Figure 1:
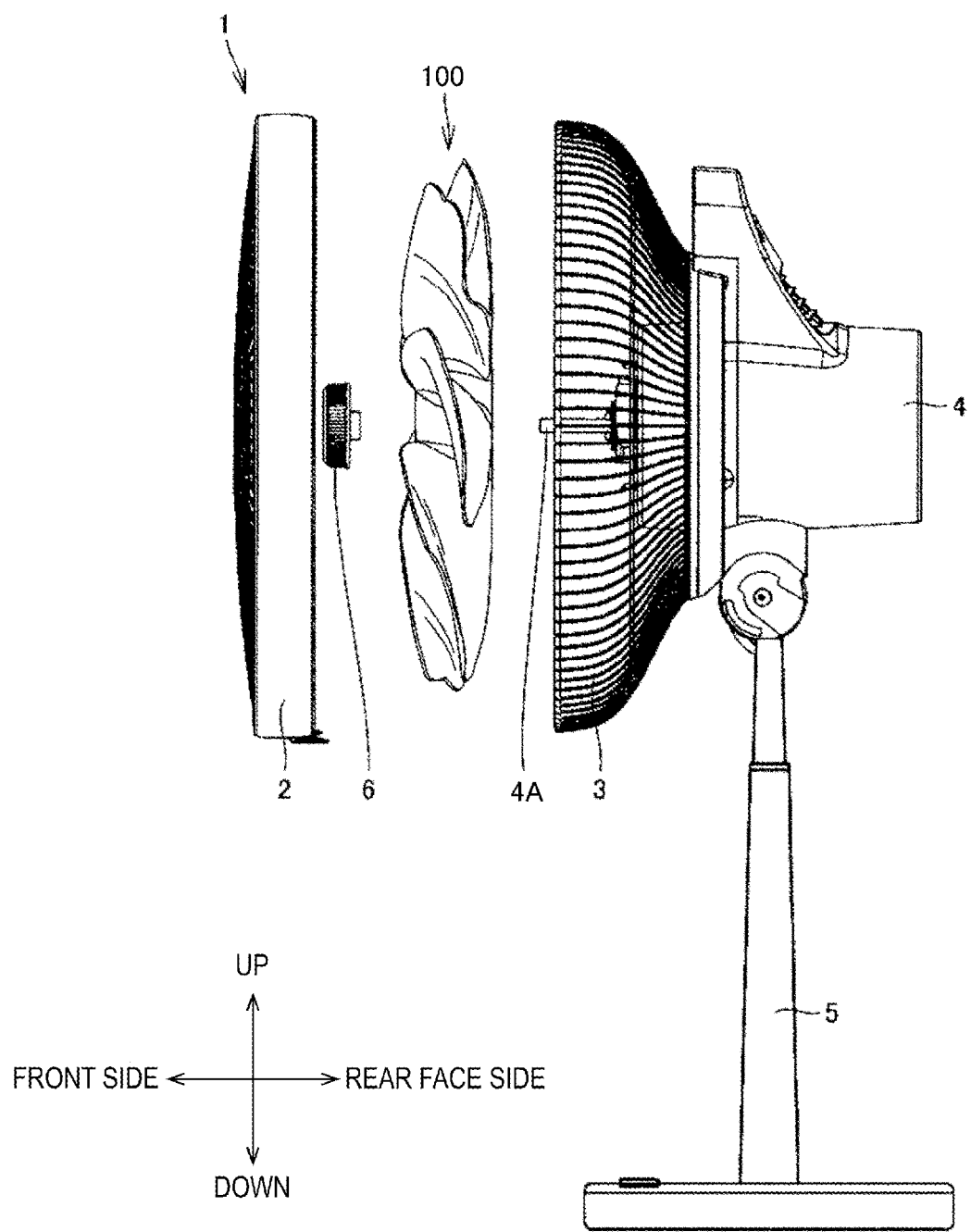
FIG. 1 is a partially exploded side view of an electric fan equipped with a propeller fan.

Embodiments of the disclosure will be described below with reference to the drawings. In the drawings, identical or equivalent elements are given the same reference signs, and overlapping descriptions thereof are omitted.

Electric Fan 1

An electric fan 1 will be described. FIG. 1 is a partially exploded side view of the electric fan 1 equipped with a propeller fan 100. The electric fan 1 includes a front guard 2, a rear guard 3, a main body 4, a stand 5, and the propeller fan 100 as illustrated in FIG. 1. The main body 4 is supported by the stand 5 and accommodates a drive motor therein, which is not illustrated. A rotation shaft 4A of the drive motor is provided on the front face of the main body 4. A rotation shaft portion 110 (see FIG. 2 and the like) of the propeller fan 100 is fixed to the rotation shaft 4A by using a screw cap 6.

The front guard 2 and the rear guard 3 are provided to surround the propeller fan 100 fixed to the main body 4. The rear guard 3 is fixed to the main body 4 to cover the rear face side (negative pressure surface side) of the propeller fan 100. The front guard 2 is fixed to the rear guard 3 to cover the front side (positive pressure surface side) of the propeller fan 100. The stand 5 is provided to place the electric fan 1 on a floor surface or the like, and supports the main body 4. An operation unit, which is not illustrated, for turning on/off the electric fan 1, switching operating states, and the like is provided at a predetermined position on the stand 5. The stand 5 may have a function of swinging of the electric fan 1 and function of adjusting a height of the electric fan 1.

Propeller Fan 100

Figure 2:
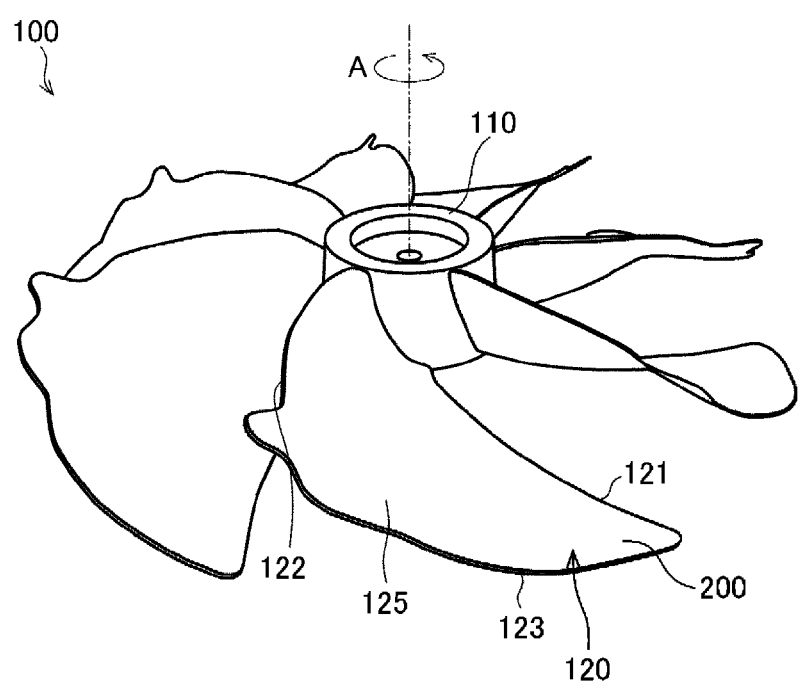
FIG. 2 is a perspective view of the propeller fan viewed from the front side.
Figure 3:
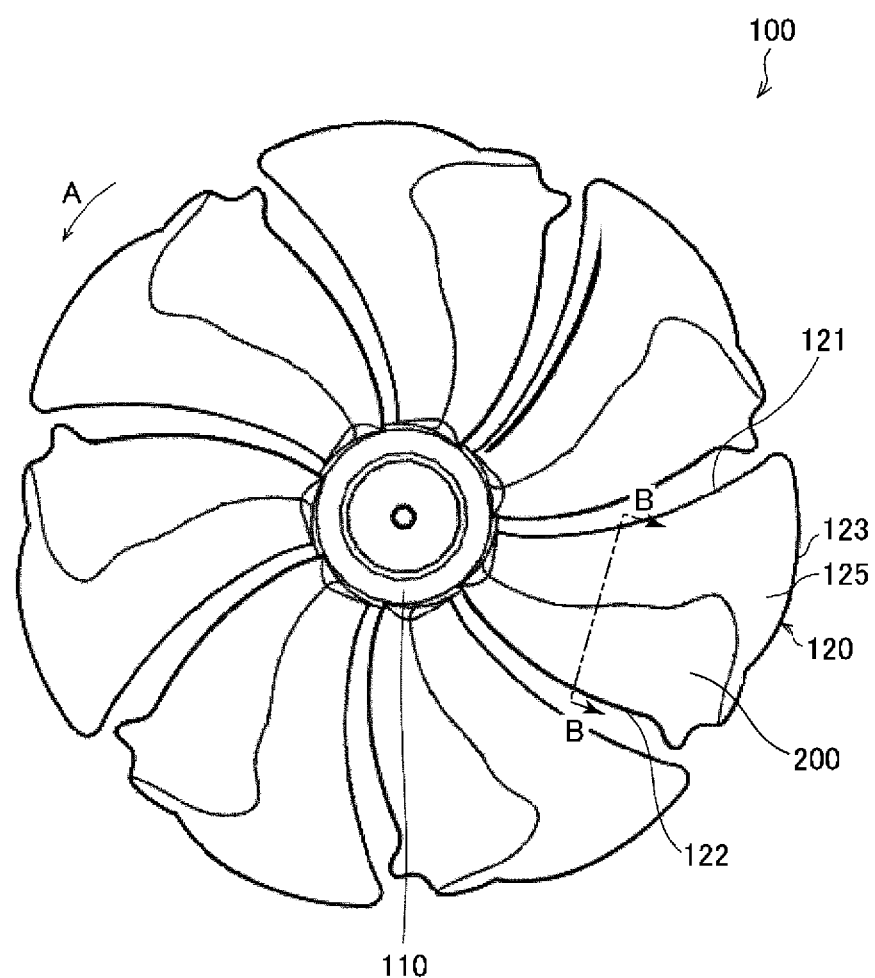
FIG. 3 is a front view of the propeller fan.

The propeller fan 100 will be described. FIG. 2 is a perspective view of the propeller fan 100 viewed from the front side. FIG. 3 is a front view of the propeller fan 100. The propeller fan 100 includes the rotation shaft portion 110 and a plurality of blades 120 as illustrated in FIGS. 2 and 3. The rotation shaft portion 110 is a boss hub of the propeller fan 100 and has a substantially cylindrical shape with a bottom. Each of the plurality of blades 120 has a smoothly curved plate shape. The plurality of blades 120 protrude from the outer circumferential surface of the rotation shaft portion 110 outward in the radial direction of the propeller fan 100. The plurality of blades 120 are arranged at equal intervals along the circumferential direction of the rotation shaft portion 110 and have the same shape. The propeller fan 100 of the present example has seven blades 120.

The propeller fan 100 is driven by the above-described drive motor and rotates in a rotation direction A, which is a counterclockwise direction in a front view, about the axis of the rotation shaft portion 110 as a rotation center. That is, the plurality of blades 120 rotate in the rotation direction A. As a result, air flows from the suction side, which is the rear face side of the propeller fan 100, toward the ejection side, which is the front side of the propeller fan 100, and blows forward from the electric fan 1.

Figure 4A:
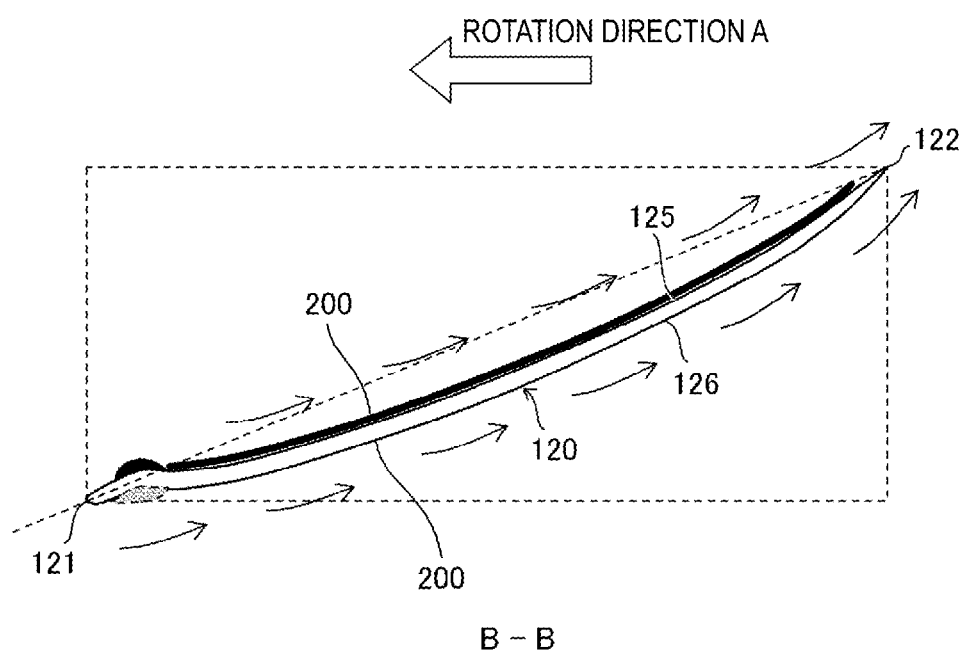
FIG. 4A is a cross-sectional view as viewed in the direction of the arrow line B-B of FIG. 3.
Figure 4B:
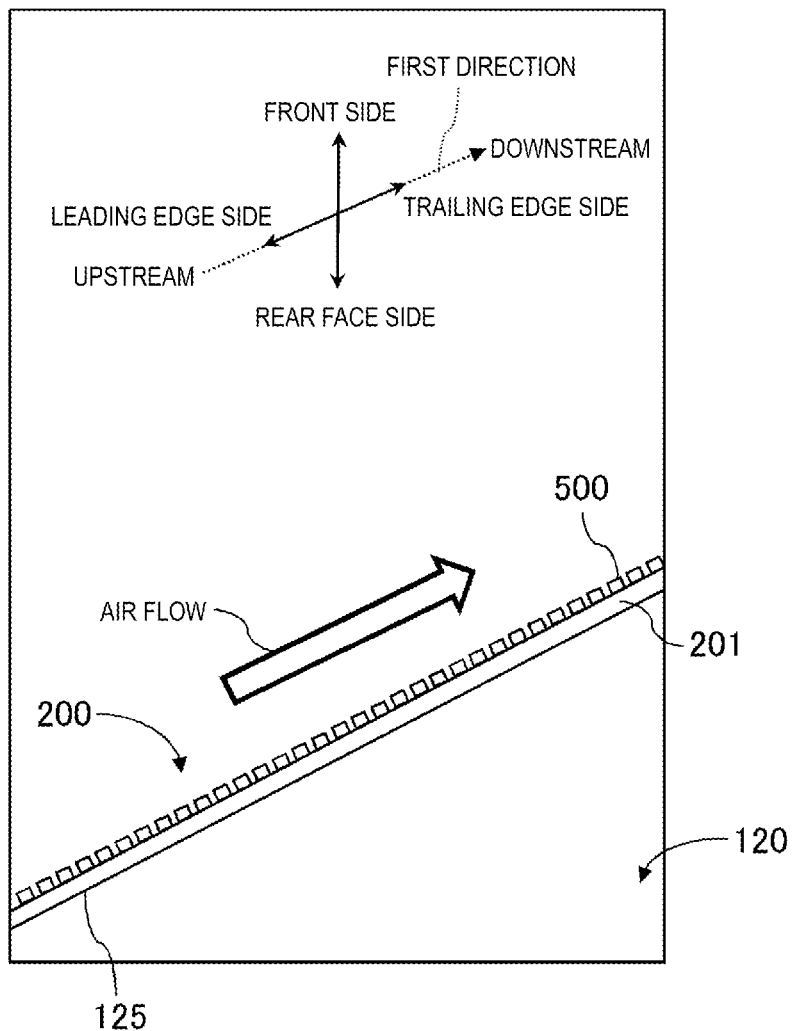
FIG. 4B is a partially enlarged view of a front face of a blade.

A detailed structure of the plurality of blades 120 will be described. FIG. 4A is a cross-sectional view as viewed in the direction of the arrow line B-B of FIG. 3. FIG. 4B is a partially enlarged view of a front face 125 of a blade 120. In the present example, the plurality of blades 120 have the same shape, and one blade 120 will be described. The blade 120 includes a leading edge portion 121, a trailing edge portion 122, and a peripheral edge portion 123 as illustrated in FIGS. 2 to 4A.

The leading edge portion 121 is an end edge portion of the blade 120 downstream in the rotation direction A. The leading edge portion 121 is curved such that a radially intermediate portion thereof protrudes toward upstream in the rotation direction A. The trailing edge portion 122 is an end edge portion of the blade 120 upstream in the rotation direction A. The trailing edge portion 122 is curved such that a radially intermediate portion thereof protrudes toward upstream in the rotation direction A. The peripheral edge portion 123 is an end edge portion extending in the rotation direction A in the blade 120. The peripheral edge portion 123 connects the radially outer end portion of the leading edge portion 121 and the radially outer end portion of the trailing edge portion 122. In the blade 120 as a whole, the distance between the leading edge portion 121 and the trailing edge portion 122 increases toward the radially outer side.

When the propeller fan 100 rotates in the rotation direction A, the air flow flows from the leading edge portion 121 toward the trailing edge portion 122 in the blade 120. The front face 125 of the blade 120 is a concavely curved positive pressure surface. A rear face 126 of the blade 120 is a convexly curved negative pressure surface. In the above-described configuration, when the propeller fan 100 rotates, the air flowing from the leading edge portion 121 onto the blade surface of the blade 120 flows from the leading edge portion 121 in the substantially circumferential direction and flows out from the trailing edge portion 122.

In the propeller fan 100, surface-processed sheets 200 are installed on the front face 125 and the rear face 126 which are blade surfaces of the blade 120. In the present example, the surface-processed sheets 200 are attached onto substantially the entire front face 125 and substantially the entire rear face 126. Alternatively, the surface-processed sheet 200 may be installed on one of the front face 125 and the rear face 126. The surface-processed sheet 200 may be installed on a part of the front face 125 or may be installed on a part of the rear face 126.

The surface-processed sheet 200 is attached to be in surface contact with the front face 125 of the blade 120 and extends along the front face 125 as illustrated in FIG. 4B. In the present example, a direction from the leading edge portion 121 toward the trailing edge portion 122, that is, a direction in which air flows relative to the rotating blade 120, corresponds to a first direction which will be described below. The radial direction of the blade 120 corresponds to a second direction which will be described below.

Surface-Processed Sheet 200

Figure 5:
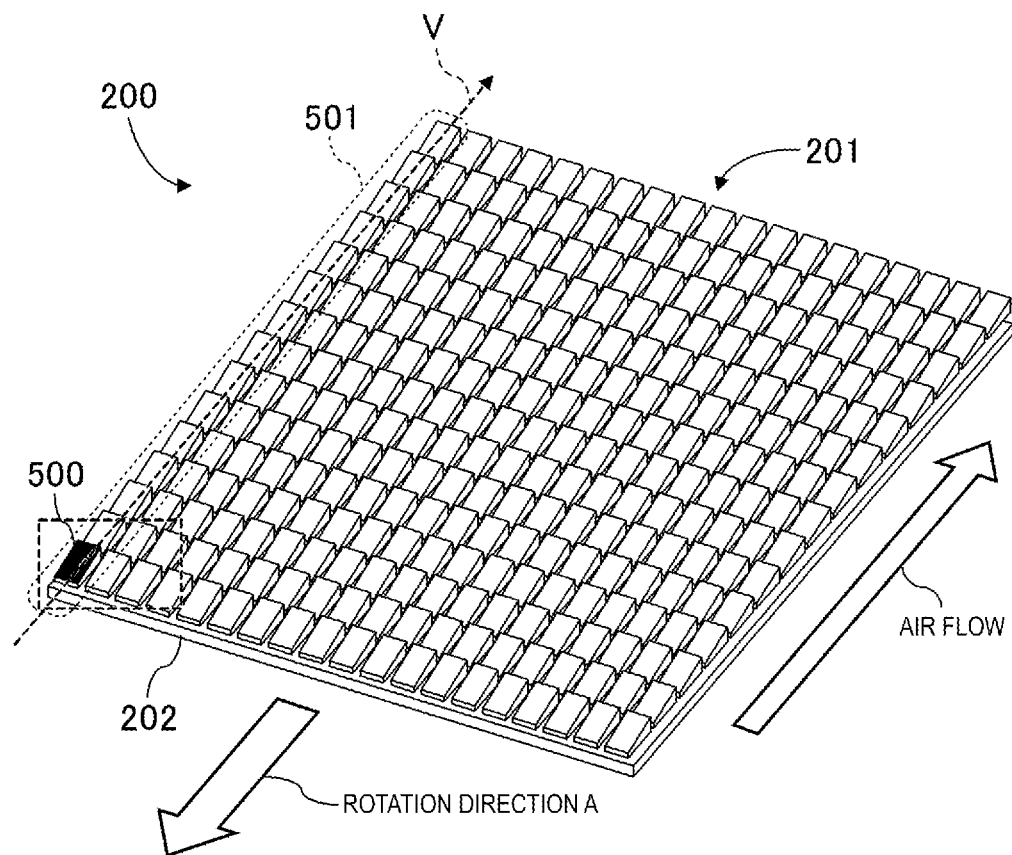
FIG. 5 is a partially enlarged perspective view of a surface-processed sheet.
Figure 5:
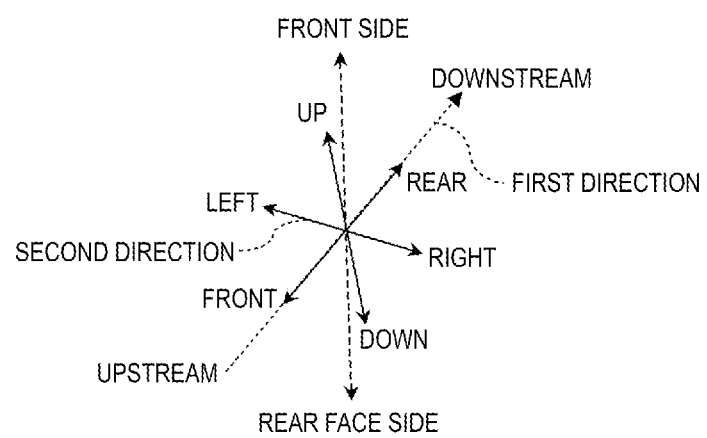
Figure 6:
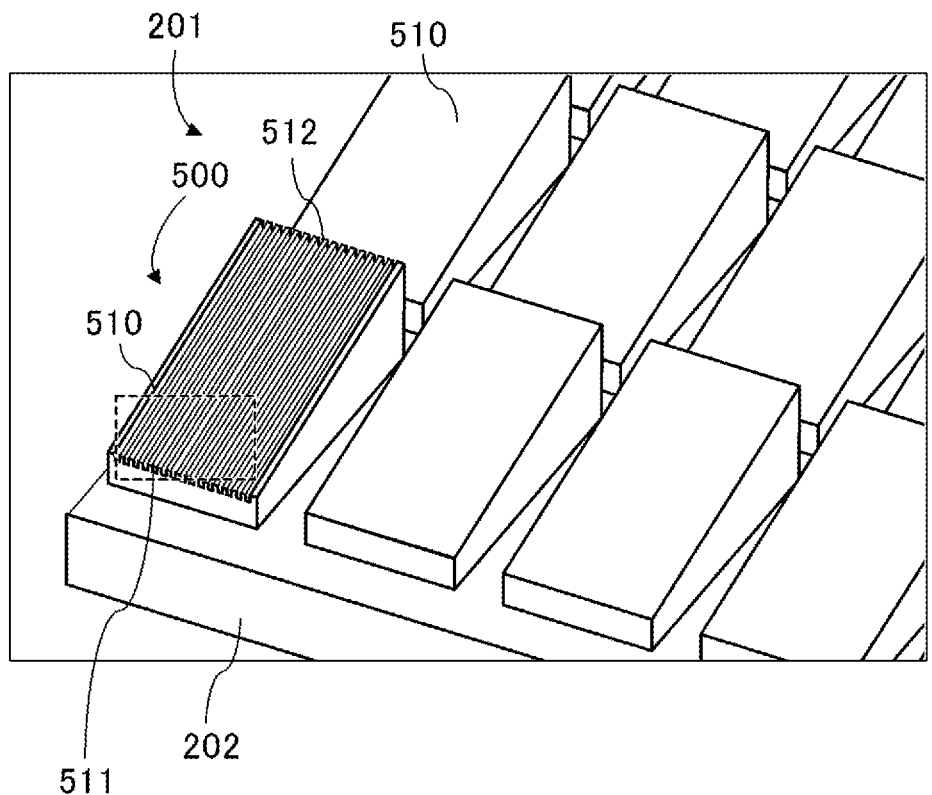
FIG. 6 is a partially enlarged perspective view of the broken line frame illustrated in FIG. 5.
Figure 6:
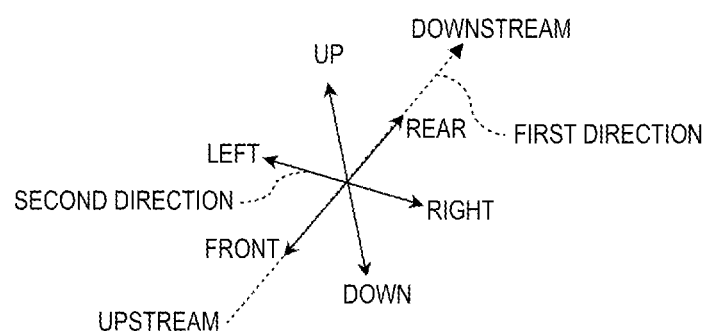

The surface-processed sheet 200 will be described. FIG. 5 is a partially enlarged perspective view of the surface-processed sheet 200. FIG. 6 is a partially enlarged perspective view of the broken line frame illustrated in FIG. 5. In the following description, the upper side, lower side, lower left side, upper right side, upper left side, and lower right side in FIG. 5 are defined as the upper side, lower side, front side, rear side, left side and right side, respectively, of the surface-processed sheet 200. The example of FIG. 5 is a part of the surface-processed sheet 200 and have sizes of 2 mm in the front-rear direction and 2 mm in the left-right direction. In FIG. 6, the fine grooves 520 are shown only in one block 500 on the left front side among a plurality of blocks 500.

In the surface-processed sheet 200, a surface-processed structure 201 is provided on a base 202 that can be installed on a target surface that is a surface of a target object as illustrated in FIGS. 5 and 6. In the following description, the blade 120 is a target object and the front face 125 is a target surface for describing the surface-processed sheet 200 installed on the front face 125 of the blade 120.

The surface-processed sheet 200 of the present example is a thin, lightweight, and flexible sheet. Specifically, a thickness of the surface-processed sheet 200 is less than 2000 μm and is about 100 μm as an example. The base 202 may be formed of a material that can be fixed to the target surface by adhesion or welding and includes, for example, at least one selected from the group consisting of resin, rubber, and metal. The resin includes, for example, at least one selected from the group consisting of polypropylene (PP), polyethylene terephthalate (PET), polymethyl methacrylate (PMMA), acrylonitrile butadiene styrene (ABS), and urethane. Rubber includes, for example, silicone rubber. Metals include at least one selected from the group consisting of aluminum and stainless steel. Since the base 202 has flexibility that enables the base is deformable in accordance with the surface shape of the target surface, it can be brought into surface contact with the target surface without a gap.

The surface-processed structure 201 includes a plurality of blocks 500. The plurality of blocks 500 are three-dimensional objects arranged on a target surface, which is a surface of a target object, and are arranged side by side in the first direction parallel to the target surface. The first direction may be a linear direction or a curved direction. In this example, the surface-processed structure 201 is formed on the base 202. The plurality of blocks 500 are arranged on the target surface via the base 202. The front-rear and left-right directions of the surface-processed sheet 200 are substantially parallel to the surface direction of the target surface. The upper side of the surface-processed sheet 200 faces opposite to the target surface. The lower side of the surface-processed sheet 200 faces the target surface.

The plurality of blocks 500 constitute a plurality of block columns 501. Each of the plurality of block columns 501 includes two or more blocks 500 arranged side by side in the first direction. A plurality of block columns 501 are arranged side by side in the second direction orthogonal to the first direction. The second direction may be a linear direction or a curved direction. Thus, the plurality of blocks 500 are two-dimensionally arrayed side by side in the first direction and the second direction on the base 202.

In the propeller fan 100, the surface-processed sheet 200 is mounted on the front face 125 of the blade 120 to make the front side of the surface-processed sheet 200 face the leading edge portion 121 and the rear side of the surface-processed sheet 200 face the trailing edge portion 122. Therefore, the rearward direction of the surface-processed sheet 200 is parallel to the first direction (see FIG. 4B) as illustrated in FIG. 5. The left-right direction of the surface-processed sheet 200 is parallel to the second direction.

The blade surface of the blade 120 of the present example is curved toward the front side of the blade 120 from the leading edge portion 121 toward the trailing edge portion 122 as illustrated in FIG. 4A. Therefore, the upward direction and the downward direction of the surface-processed sheet 200 are inclined relative to the front direction and the rear face direction, respectively, of the blade 120 as illustrated in FIGS. 4B and 5. Specifically, the upward direction of the surface-processed sheet 200 is inclined upstream in the first direction relative to the front direction of the blade 120.

Each of the plurality of blocks 500 includes an inclined surface 510 extending from upstream to downstream in the first direction such that the distance from the target surface gradually increases as illustrated in FIG. 6. The inclined surface 510 is at least a part of a surface of the block 500 facing upward. In this example, the entire top face of the block 500 forms the inclined surface 510 that is inclined upward toward the rear.

A plurality of inclined surfaces 510 of the plurality of blocks 500 are arranged on one line V extending in the first direction. Specifically, in each of the plurality of block columns 501, one line V extending in the first direction passes through the inclined surfaces 510 of all the blocks 500 constituting the block column 501 in a plan view. The line V is an imaginary straight line or curved line extending parallel to the first direction. In the example of FIG. 5, the line V linearly extending in the rearward direction passes through all the blocks 500 in the block column 501 in a plan view.

Figure 7A:
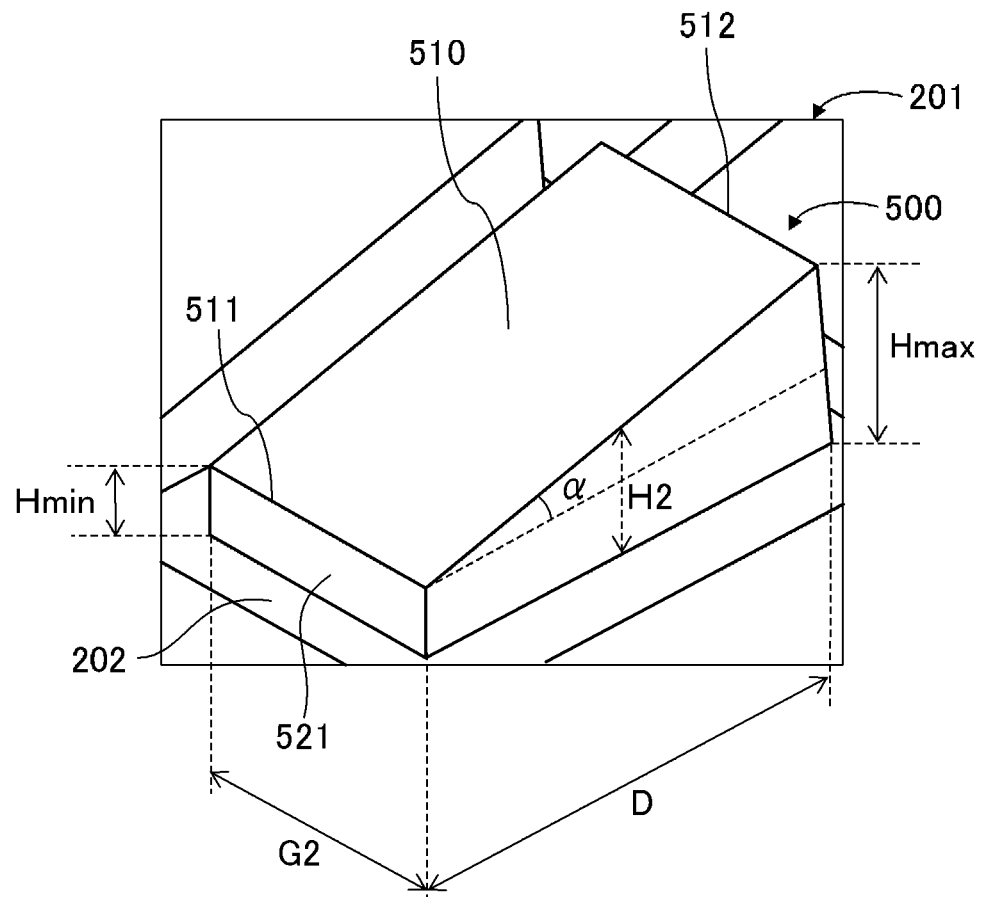
FIG. 7A is an enlarged perspective view of one block.
Figure 7B:
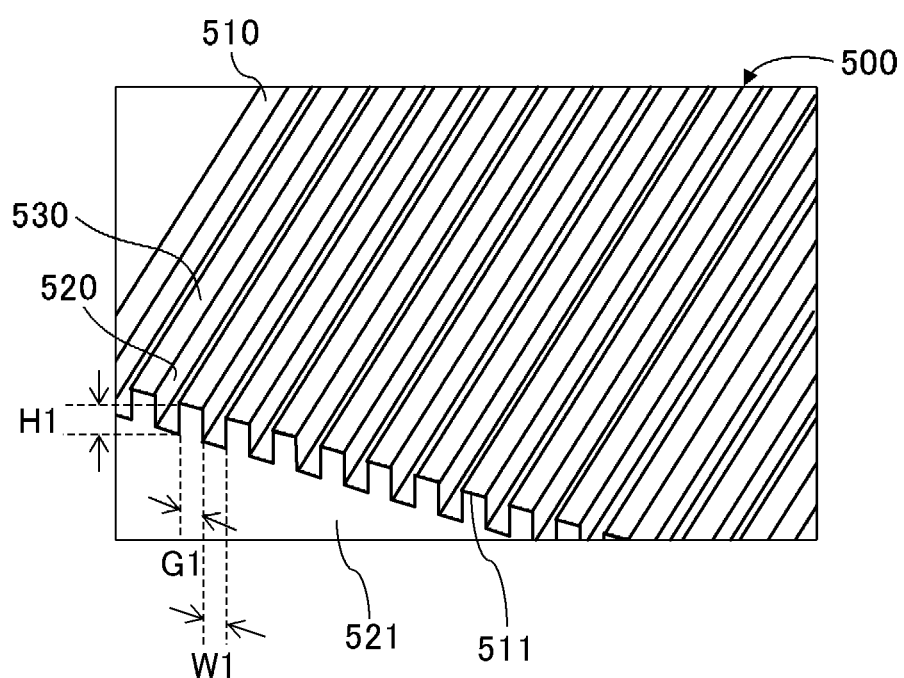
FIG. 7B is a partially enlarged perspective view of the broken line frame illustrated in FIG. 6.

A detailed structure of the plurality of blocks 500 will be described. FIG. 7A is an enlarged perspective view of one block 500. FIG. 7B is a partially enlarged perspective view of the broken line frame illustrated in FIG. 6. In FIG. 7A, fine grooves 520 provided in the blocks 500 are not shown.

The plurality of blocks 500 may be made of a material that can be formed on the base 202 and may be made of the same material as the base 202 or a material different from the base 202. The plurality of blocks 500 may be produced by molding such as injection molding or may be produced by removal processing such as milling, laser processing, or etching. In this example, the top face of the base 202 is subjected to fine processing by etching to produce a plurality of blocks 500 having the same shape as each other. Hereinafter, one block 500 will be described.

The inclined surface 510 includes a function of generating an air flow flowing in the first direction by coming into contact with air flowing into the front face 125 during rotation of the blades 120. In the example of FIG. 7A, the block 500 has a rectangular parallelepiped shape that is long in the first direction to make the inclined surface 510 to guide the air in the first direction over a longer distance. The inclined surface 510 is a flat surface inclined to get higher toward downstream in the first direction.

The inclined surface 510 has a relatively large area to be sufficiently in contact with the air flowing into the front face 125. When the surface-processed sheet 200 is viewed in a plan view, the proportion of the total area of the plurality of inclined surfaces 510 to the surface-processed sheet 200 is, for example, 60% or more of the whole. In the present example, the length of the inclined surface 510 in the first direction is equal to the depth D, which is the length of the block 500 in the first direction. The length of the inclined surface 510 in the second direction is equal to the length of the block 500 in the second direction. The length of the block 500 in the second direction is equal to a groove spacing G2 of a block clearance 550 which will be described below. The groove spacing G2 is the distance between two adjacent block clearance 550.

The inclined surface 510 includes an upstream end portion 511 and a downstream end portion 512 in the first direction. In the example of FIG. 7A, the inclined surface 510 is a flat surface that is linearly inclined from the upstream end portion 511 at a front end of the inclined surface 510 to the downstream end portion 512 at a rear end of the inclined surface 510. Accordingly, a height H2 of the inclined surface 510 has a minimum value Hmin at the upstream end portion 511 and a maximum value Hmax at the downstream end portion 512. In other words, the distance from the target surface to the inclined surface 510 is minimized at the upstream end portion 511 and maximized at the downstream end portion 512.

The height H2 of the inclined surface 510 is equal to the height of the block 500. As the height H2 of the upstream end portion 511 is smaller, the contact area between the air flowing into the block 500 from upstream in the first direction and the front face 521 of the block 500 can be made smaller. In this example, since the height H2 of the upstream end portion 511 is the minimum value Hmin, the contact area can be suppressed and the air can smoothly move onto the inclined surface 510.

In the block 500, the height difference of the inclined surface 510 and a depth D determine an inclination angle α of the inclined surface 510 relative to the target surface. As the inclination angle α increases, while the air moving on the inclined surface 510 can be moved to a position higher and more distant from the target surface, the contact pressure between the air and the inclined surface 510 increases and the flow rate of the air may decrease. As the inclination angle α is smaller, while it is possible to mitigate a decrease in the flow rate of the air moving on the inclined surface 510, the air may not be moved to a position highly away from the target surface. From this viewpoint, the inclination angle α may be in the range of 6 degrees to 27 degrees.

Furthermore, a size and a shape of the inclined surface 510 are not limited to the above-described examples. For example, the inclination angle α is not limited to the range of 6 degrees to 27 degrees described above and is at least greater than 0 degrees and less than 45 degrees.

As illustrated in FIG. 7B, each of the plurality of blocks 500 includes a plurality of fine grooves 520 provided on the inclined surface 510. In other words, the top face of each block 500 includes a plurality of fine grooves 520. The plurality of fine grooves 520 are spaced apart from each other, are arranged side by side in a second direction orthogonal to the first direction, and extend from upstream to downstream in the first direction. The plurality of fine grooves 520 include a function of forming an air layer in which air flows relatively slow inside the fine grooves 520. As a result, the air passing near the upper portion of the fine grooves 520 can pass as if sliding on the surface of the air layer formed inside the fine grooves 520. That is, the plurality of fine grooves 520 are provided to reduce the contact area between the air flowing along the inclined surface 510 and the inclined surface 510, thereby reducing the contact resistance given to the air flow on the inclined surface 510 and allowing the air flow to smoothly flow.

In the present example, the plurality of fine grooves 520 extend from the upstream end portion 511 to the downstream end portion 512 in the first direction at the same depth on the inclined surface 510. A rail-shaped protruding portion 530 extending in the first direction is formed between two adjacent fine grooves 520 among the plurality of fine grooves 520. In other words, the top face of each block 500 includes a plurality of protruding portions 530 each provided between two adjacent fine grooves 520 among the plurality of fine grooves 520. Therefore, the plurality of protruding portions 530 and the plurality of fine grooves 520 are alternately arranged on the inclined surface 510. The air flowing on the inclined surface 510 flows in the first direction along the top faces of the plurality of protruding portions 530. In the present example, since the plurality of fine grooves 520 have the same shape, one fine groove 520 will be described.

A length of a fine groove 520 in the second direction is a groove width W1. As the groove width W1 becomes narrower, while an air layer is more likely to be formed inside the fine groove 520, it is more difficult to accurately produce the fine groove 520 and the contact area of the air and the inclined surface 510 increases. As the groove width W1 becomes greater, while it is easier to accurately produce the fine groove 520, it becomes difficult to form an air layer inside the fine groove 520 and the air passing near the upper portion of the fine groove 520 is more likely to flow into the fine groove 520. When air flows into the inside of the fine groove 520, frictional resistance in accordance with the contact area of the air and the fine groove 520 is generated. From this viewpoint, the groove width W1 of the fine groove 520 is in the range of 0.5 μm to 600 μm.

The vertical length of the fine groove 520 is a height H1. As the height H1 becomes smaller, while it is easier to accurately produce the fine grooves 520, the air passing near the upper portion of the fine groove 520 is more likely to flow into the fine groove 520. As the height H1 becomes greater, while the air layer in the fine groove 520 becomes deeper and thus can be easily formed, when the fine groove 520 becomes too deep, an air layer is formed at a deep position, the upper portion of the fine groove 520 becomes a resistance, and it becomes difficult to accurately produce the fine groove 520. Furthermore, when the height H1 is great, since the height of the protruding portion 530 relative to the lateral width becomes great, the rigidity of the protruding portion 530 may become small, and the protruding portion 530 may be easily bent. When the protruding portion 530 is bent, the air layer in the fine groove 520 may be broken. From this viewpoint, the height H1 of the fine groove 520 is in the range of 0.5 μm to 300 μm.

The groove spacing G1 is the distance between two adjacent fine grooves 520 and is equal to the length of the protruding portion 530 in the second direction. As the groove spacing G1 becomes larger, while it becomes easier to accurately produce the plurality of fine grooves 520, the number of fine grooves 520 that can be formed on the inclined surface 510 decreases and thus the contact resistance applied to the air flow on the inclined surface 510 increases. As the groove spacing G1 becomes narrower, while the contact resistance applied to the air flow on the inclined surface 510 becomes smaller since the number of the fine grooves 520 that can be formed on the inclined surface 510 increases, it becomes difficult to accurately produce the plurality of fine grooves 520. From such a viewpoint, the groove spacing G1 of the fine grooves 520 is in the range of 1 μm to 800 μm.

Furthermore, the number of the fine grooves 520, the groove width W1, the height H1, and the groove spacing G1 are not limited to the examples described above and may be values different from the ranges described above. The plurality of fine grooves 520 are not limited to be in the mode in which they extend in the first direction over the entire inclined surface 510 and may extend in the first direction in a part between the upstream end portion 511 and the downstream end portion 512.

Figure 8:
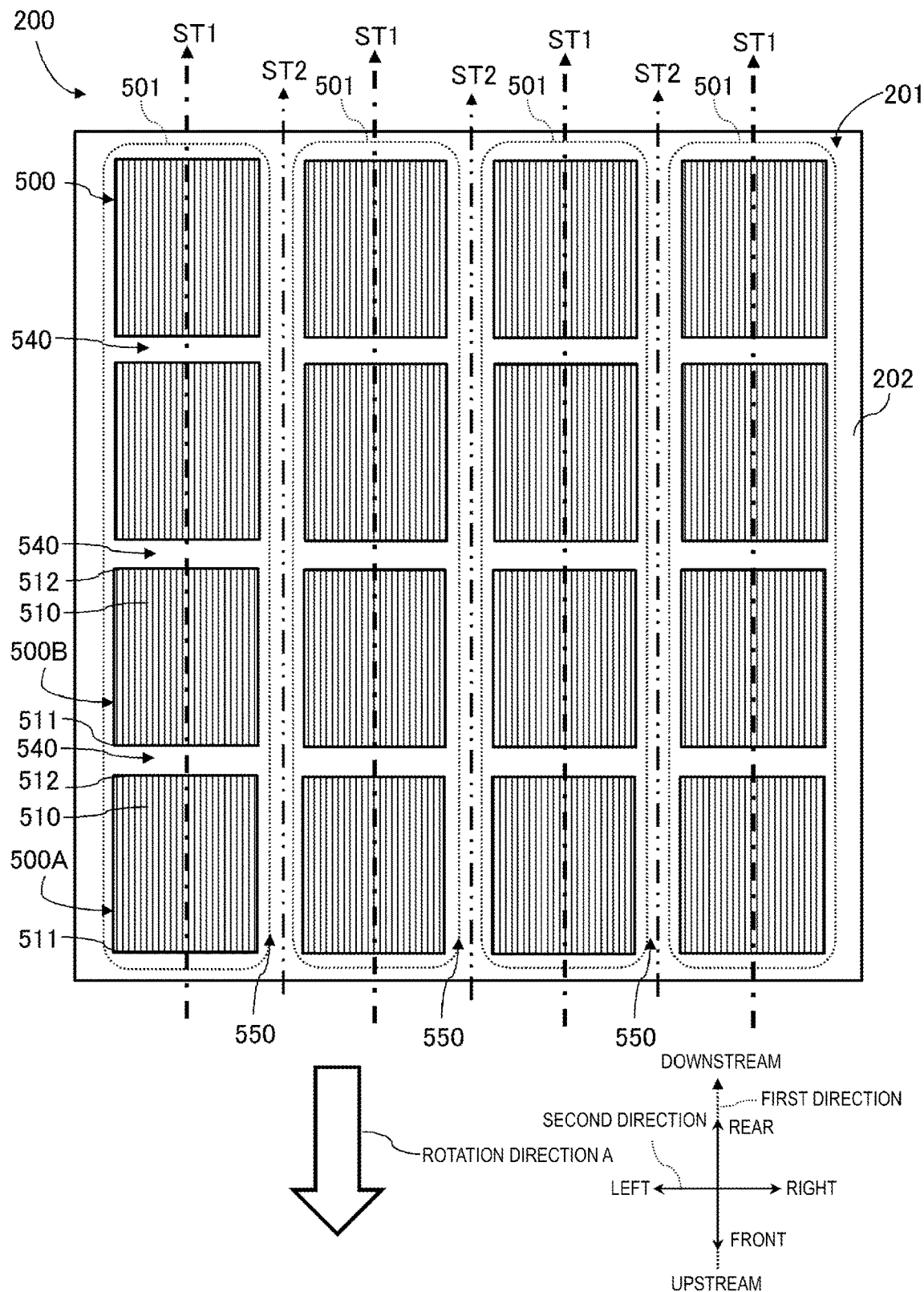
FIG. 8 is a partially enlarged schematic plan view of a surface-processed sheet.
Figure 9A:
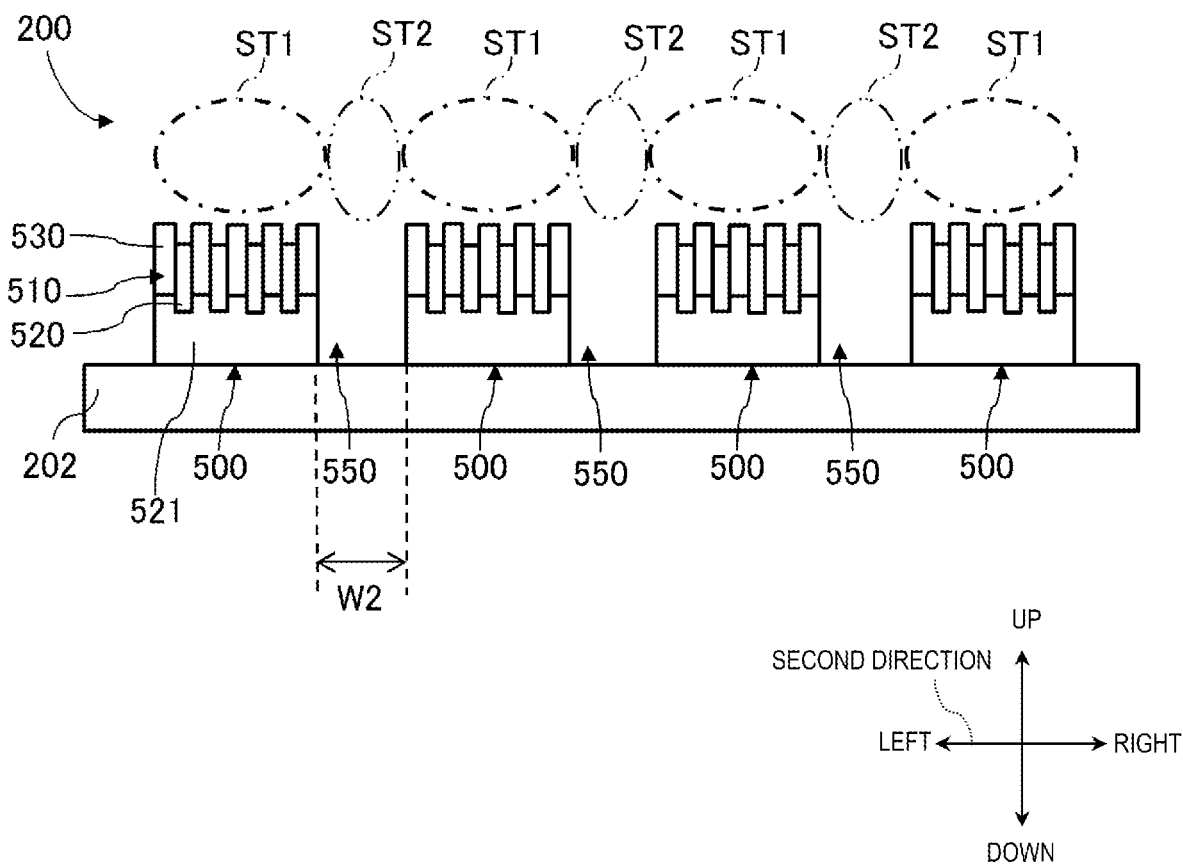
FIG. 9A is a schematic front view of the surface-processed sheet illustrated in FIG. 8.
Figure 9B:
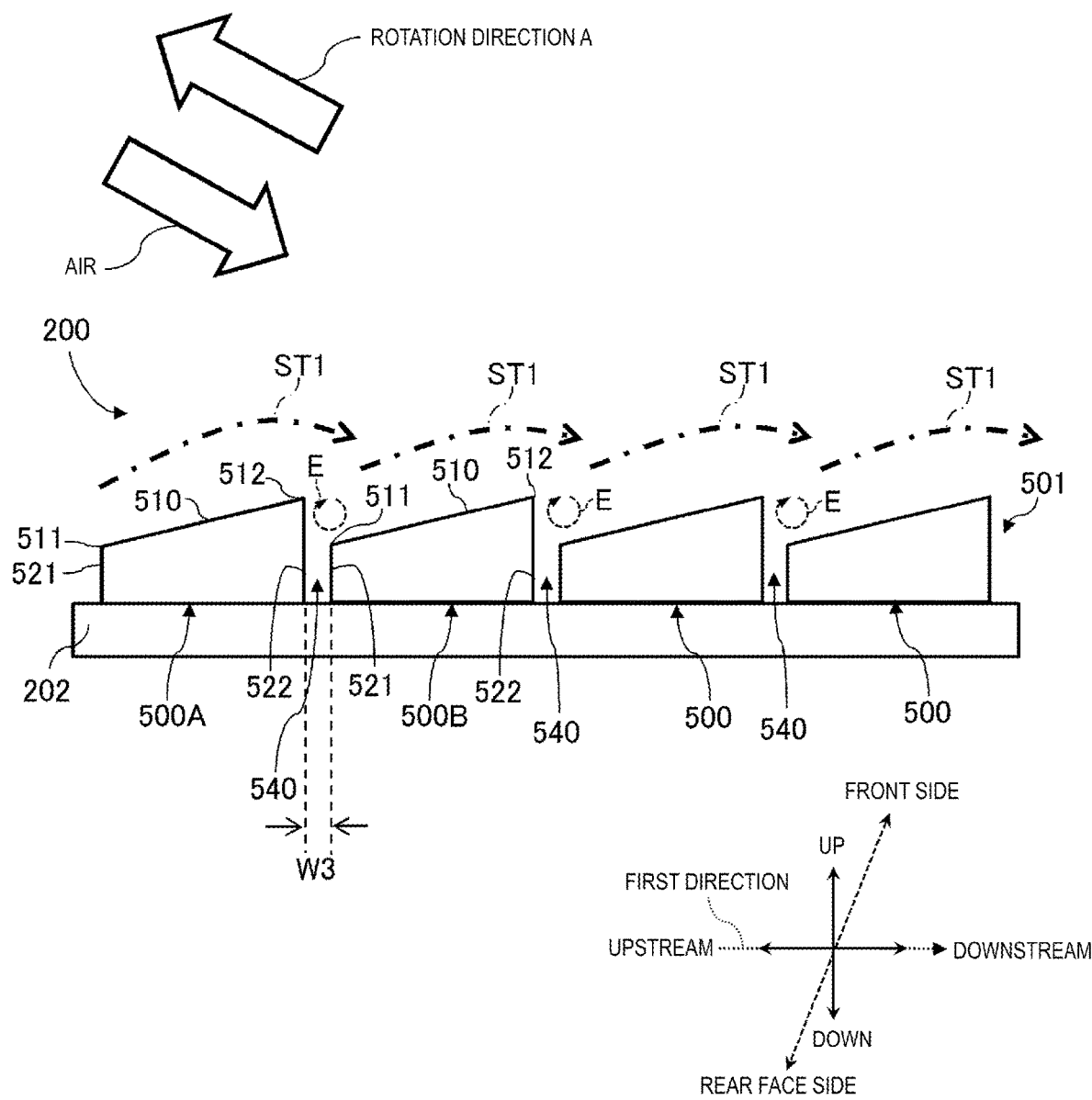
FIG. 9B is a schematic side view of the surface-processed sheet illustrated in FIG. 8.

An arrangement relationship of the plurality of blocks 500 will be described. FIG. 8 is a partially enlarged schematic plan view of the surface-processed sheet 200. FIG. 9A is a schematic front view of the surface-processed sheet 200 illustrated in FIG. 8. FIG. 9B is a schematic side view of the surface-processed sheet 200 illustrated in FIG. 8. In the example of FIG. 8, four block columns 501 are arranged side by side in the second direction, and four blocks 500 are arranged side by side in the first direction in each block column 501.

In each of the plurality of blocks 500, the entire inclined surface 510 is exposed toward upstream in the first direction of the block 500. To be specific, in the example of FIGS. 8 and 9B, two blocks 500 among the plurality of blocks 500 that are adjacent to each other in the first direction are defined as an upstream block 500A and a downstream block 500B located downstream of the upstream block 500A. When viewed from the rear surface 522 of the upstream block 500A, the entire inclined surface 510 of the downstream block 500B is exposed without being blocked by other members.

Furthermore, the downstream end portion 512 of the inclined surface 510 in the first direction has the largest distance from the target surface in the block 500. That is, the downstream end portion 512 of the inclined surface 510 is located at the highest position in the block 500.

In addition, the upstream end portion 511 of the inclined surface 510 of the downstream block 500B in the first direction is in a shorter distance from the target surface than the downstream end portion 512 of the upstream block 500A in the first direction. That is, the upstream end portion 511 of the downstream block 500B is located at a position lower than the downstream end portion 512 of the upstream block 500A.

In each of the plurality of block columns 501, a clearance 540 having a groove shape and extending in the direction intersecting the first direction is formed between two blocks 500 adjacent to each other in the first direction among the plurality of blocks 500. In the example of FIGS. 8 and 9B, each of the clearances 540 extending in the second direction is formed between two blocks 500 adjacent to each other in the front-rear direction in each block column 501.

The block clearance 550 having a groove shape and extending in the direction intersecting the second direction is formed between two blocks 500 adjacent to each other in the second direction among the plurality of blocks 500. In the example of FIGS. 8 and 9A, in two block columns 501 adjacent to each other, the block clearance 550 extending in the first direction is formed between the blocks 500 of the left block column 501 and the blocks 500 of the right block column 501.

As described above, in the plurality of blocks 500, two blocks 500 adjacent to each other in the first direction are arranged with the clearance 540 interposed therebetween, and two blocks 500 adjacent to each other in the second direction are arranged with the block clearance 550 interposed therebetween. Since the plurality of blocks 500 are spaced apart from each other as described above, the plurality of blocks 500 can be accurately and easily produced on the base 202 as compared with, for example, forming the plurality of blocks 500 to be connected to each other.

The length of the block clearance 550 in the second direction is a groove width W2 as illustrated in FIG. 9A. The block clearance 550 includes a function of forming an air layer between two blocks 500 adjacent to each other in the second direction. As a result, the air passing near the upper portion of the block clearance 550 can pass as if sliding on the surface of the air layer formed in the block clearance 550. That is, the block clearance 550 is provided to reduce the contact area between the air passing near the upper portion of the block clearance 550 and the surface-processed sheet 200, thereby reducing the contact resistance given to the air flow on the block clearance 550 and allowing the air flow to flow smoothly.

As the groove widths W2 become narrower, while it becomes easier to form the air layer in the block clearance 550, it becomes more difficult to accurately produce the clearance 550 and it becomes more difficult to produce a plurality of blocks 500 arranged side by side in the second direction. As the groove widths W2 becomes greater, while the block clearances 550 can be more accurately formed and the plurality of blocks 500 can be more easily produced side by side in the second direction, air layer is less likely to be formed in the block clearance 550 and the air passing near the upper portions of the block clearance 550 is more likely to flow into the block clearance 550. When the air flows into the block clearances 550, frictional resistance in accordance with the contact area between the air and the block clearance 550 is generated. From this viewpoint, the groove widths W2 of the block clearance 550 is in the range of 10 μm to 600 μm.

The groove width W1 of each of the plurality of fine grooves 520 in the second direction described above is narrower than the groove width W2 of the block clearance 550 in the second direction. Here, the flow rate of the air flowing onto the surface-processed sheet 200 varies depending on, for example, rotation speeds of the propeller fan 100. In grooves such as the fine groove 520 and the block clearance 550, the relationship between the flow rate of air toward the groove and the width of the groove affects whether an air layer can be effectively formed inside the groove. When it is not possible to form air layers in the groove effectively, air flows into the groove and the groove acts as resistance that obstructs the flow of the air.

For example, it is assumed that the flow rate width of the air flowing onto the surface-processed sheet 200 is divided into three ranges of a low speed range, a medium speed range, and a high speed range. When the flow rate of the inflowing air is in a low speed range, the block clearance 550 having a relatively great width can form the air layer more effectively than the fine groove 520 having a relatively narrow width. When the flow rate of the inflowing air is in a medium speed range, both the block clearance 550 and the fine groove 520 can effectively form air layer. When the flow rate of the inflowing air is in a high speed range, the fine groove 520 can form air layer more effectively than the block clearance 550. That is, even when the flow rate of the air flowing onto the surface-processed sheet 200 is in any velocity range, air layers can be effectively formed by at least one of the block clearance 550 or the fine groove 520.

Such a surface-processed structure 201 can exhibit a friction reducing effect over a wide flow rate range of the inflowing air.

A ratio of the height H1 to the groove width W1 for a fine groove 520 is referred to as an aspect ratio of the fine groove 520. A ratio of the height H2 to the groove width W2 for a block clearance 550 is referred to as an aspect ratio of the block clearance 550. The aspect ratio of the block clearance 550 effective in the low speed range may be lower than the aspect ratio of the fine groove 520 effective in the high speed range. In this case, the surface area of the block clearance 550 can be made relatively smaller than the surface area of the fine groove 520. Therefore, even when an air layer is not effectively formed in the block clearance 550 in the high speed range, the contact area with the air flowing into the block clearance 550 can be reduced, and the frictional resistance when the block clearance 550 act as resistance can be reduced.

In the present example, the plurality of blocks 500 are arranged to form a plurality of block clearances 550 continuously arranged in the first direction. The plurality of block clearances 550 constitute one fluid flow path extending in the first direction. Specifically, the plurality of blocks 500 are two-dimensionally arrayed in a lattice shape on the base 202 as illustrated in FIGS. 5 and 8. For this reason, a fluid flow path in which the plurality of block clearances 550 are continuously arranged in the first direction is formed between two adjacent block columns 501. Sets of the plurality of fine grooves 520 each provided on the top face of the block 500 and the fluid flow paths are alternately arranged in the second direction. The air flowing through the fluid flow path smoothly flows in the first direction without meandering.

A length of the clearance 540 in the first direction is a groove width W3 as illustrated in FIG. 9B. As will be described below, the air flowing onto the surface-processed sheet 200 from upstream in the first direction continuously flows along the inclined surfaces 510 of the plurality of blocks 500 arranged side by side in the first direction. As the groove width W3 become greater, it is easier to produce the plurality of blocks 500 by arranging them side by side in the first direction. However, when the air flows from the inclined surface 510 of the upstream block 500A to the inclined surface 510 of the downstream block 500B, part of the air flows into the clearance 540, and the air volume of the air flow may decrease.

On the other hand, it is highly likely that, as the groove widths W3 become narrower, the blocks 500 adjacent to each other may be connected in the first direction when the plurality of blocks 500 are produced. However, even if adjacent blocks 500 are connected in the first direction, there is no significant problem in the function of causing the air to flow in the first direction. From this viewpoint, the groove width W3 of the clearance 540 is within the range of 300 μm or less.

The flow of air on the surface-processed sheet 200 will be described. As described above, when the propeller fan 100 rotates in the rotation direction A, the air moving relative to the rotating blade 120 flows onto the blade surface of the blade 120. At this time, the air flows into the front face 125 and the rear face 126 from the leading edge portion 121 downstream in the rotation direction A. Although the flow of air on the front face 125 will be described below, the same applies to the flow of air on the rear face 126.

The surface-processed sheet 200 rotates in the rotation direction A along with the rotation of the blade 120 as illustrated in FIG. 8. In this example, the upward direction of the surface-processed sheet 200 is inclined forward that is upstream in the first direction relative to the front direction of the blade 120 as described above. Thus, the surface-processed sheet 200 rotating in the rotation direction A moves toward the upper front side thereof as illustrated in FIG. 9B. Therefore, the air flowing into the front faces 125 relatively move to approach the surface-processed sheet 200 from the upper front side.

In this case, the air moves from upstream to downstream in the first direction on the surface-processed sheet 200 as follows. In the surface-processed sheet 200, the air flowing toward the surface-processed sheet 200 splits into a plurality of mainstreams ST1 and a plurality of sub-streams ST2 as illustrated in FIG. 8. In the plurality of mainstreams ST1, most of the air flowing onto the surface-processed sheet 200 flows above the plurality of blocks 500 occupying most of the surface-processed sheet 200 in a plan view. In the plurality of sub-streams ST2, the rest of the air flowing onto the surface-processed sheet 200 flows on both left side and right side of each of the plurality of blocks 500 in a plan view. Thus, on the upper side of the surface-processed sheet 200, the air having flowed in flows in the first direction such that the mainstreams ST1 and the sub-streams ST2 are alternately and repeatedly arranged in the left-right direction.

The plurality of mainstreams ST1 are air flows formed corresponding to each of the plurality of block columns 501 as illustrated in FIGS. 8 and 9B. In each of the plurality of mainstream ST1, the air flows from upstream to downstream in the first direction along the inclined surfaces 510 of the two or more blocks 500 constituting the corresponding block column 501. To be more specific, when the air flows along the inclined surface 510 of the upstream block 500A, the air is separated upward from the front face 125 of the blade 120 as the air moves to downstream from the upstream end portion 511.

The plurality of fine grooves 520 described above are provided on the inclined surface 510 of each block 500. As the plurality of fine grooves 520 are provided, the area of the outer surface of the inclined surface 510 is small. The outer surface of the inclined surface 510 is substantially constituted by the top end surfaces of the plurality of protruding portions 530. Since the groove width W1 of each of the plurality of fine grooves 520 are extremely narrow as described above, the air layer is formed in the fine groove 520 into which air does not easily enter. Therefore, since the air flowing on the inclined surface 510 substantially comes into contact with only the outer surface of the inclined surface 510, the contact area between the inclined surface 510 and the air is reduced. The contact resistance given to the air flow on the inclined surface 510 is reduced, and the reduction in the flow rate of the mainstreams ST1 can be mitigated.

Furthermore, the air flows downstream beyond the downstream end portion 512 of the upstream block 500A and moves onto the inclined surface 510 of the downstream block 500B. In the present example, the entire inclined surface 510 of the downstream block 500B is exposed toward the upstream block 500A side, and the downstream end portion 512 is the highest portion in the upstream block 500A. Due to the difference in height between the downstream end portion 512 of the upstream block 500A and the upstream end portion 511 of the downstream block 500B, the air flow continuously flowing above the upstream block 500A and the downstream block 500B generates an air vortex E near the upper side of the upstream end portion 511 of the downstream block 500B.

Accordingly, when the mainstream ST1 flowing on the inclined surface 510 of the upstream block 500A passes over the downstream end portion 512 of the upstream block 500A, the mainstream ST flows as if sliding above the air vortex E and moves to the inclined surface 510 of the downstream block 500B. That is, the air vortex E can hinder the mainstream ST1 from flowing into the clearance 540 between the upstream block 500A and the downstream block 500B and thus reduce the contact resistance applied to the mainstream ST1.

In addition, in this example, the upstream end portion 511 of the downstream block 500B is closer to the target surface than the downstream end portion 512 of the upstream block 500A. For this reason, the air flowing out from the downstream end portion 512 of the upstream block 500A easily moves to the inclined surface 510 of the downstream block 500B without interfering with the upstream end portion 511 of the downstream block 500B. Furthermore, since the clearance 540 between the upstream block 500A and the downstream block 500B is extremely narrow, the air flowing from the upstream block 500A to the downstream block 500B is hindered from flowing into the clearance 540.

The air repeats the above-described movement in each block column 501 to continuously move as if jumping on the inclined surfaces 510 of two or more blocks 500 arranged side by side in the first direction. The air moves, on each inclined surface 510, from a position downstream of the upstream end portion 511 to the downstream end portion 512, rather than moving from the upstream end portion 511 to the downstream end portion 512. Thus, the movement distance of the air in the first direction on each inclined surface 510 is reduced, and thus the contact resistance applied to the air flow on the inclined surface 510 is further reduced.

Since the contact resistance applied to the air flow on the inclined surface 510 is relatively small in each block column 501 as described above, the mainstream ST1 smoothly flows in the first direction. When the mainstream ST1 flows from the upstream block 500A to the downstream block 500B, a decrease in flow rate is suppressed due to the influence of the air vortex E. The plurality of mainstreams ST1 flows smoothly and stably while deviation from the first direction is curbed.

The plurality of sub-streams ST2 are air flows formed between the plurality of block columns 501 in a plan view as illustrated in FIGS. 8 and 9A. In each of the plurality of sub-streams ST2, the air flows from upstream to downstream in the first direction along the fluid flow path formed near the upper portion of the plurality of block clearances 550 arranged in the first direction. A sub-stream ST2 is sandwiched between two mainstreams ST1 flowing on the left and right sides of the sub-stream ST2. Since the block clearance 550 is wider than the fine groove 520 as described above and the air vortex E is not generated in the block clearance 550, a difference in flow rate is created between the sub-stream ST2 and the mainstream ST1. That is, since the sub-stream ST2 and the mainstreams ST1 on the left and right sides thereof have different flow rates, deviation of the sub-stream ST2 from the first direction is curbed.

As described above, in the surface-processed sheet 200, the air flows in the first direction due to the plurality of mainstreams ST1 and the plurality of sub-streams ST2, and a distribution of different flow rates is created in the second direction, which is the span direction. That is, in the laminar boundary layer on the surface-processed sheet 200, stripes of flow rates in which relatively low rate layers and high rate layers alternate are formed. The momentum of the air flow flowing on the surface-processed sheet 200 in the first direction spreads in the span direction. As a result, growth of the turbulent flow region can be delayed as compared with the case where a uniform flow flows on the surface-processed sheet 200.

As described above, in the surface-processed sheet 200 having the above-described surface-processed structure 201, the plurality of mainstreams ST1 and sub-streams ST2 can move smoothly and stably in the first direction. Since the surface-processed sheet 200 is provided on the plurality of blades 120, the propeller fan 100 can smoothly rotate with reduced air resistance at the time of rotation and can accurately blow higher-speed air in the first direction.

An example of a method of designing the surface-processed structure 201 described above will be described. In the following examples, among flows of fluids and flow rates that may occur in an environment or a product to which the surface-processed structure 201 is applied, a flow that is a main target of the surface-processed structure 201 will be referred to as a target flow. The surface-processed structure 201 is designed with two flows among a plurality of flows having flow rates different from each other as target flows.

Since the surface-processed structure 201 of the present example is applied to the blade 120 of the electric fan 1, a plurality of air flows having different flow rates may be generated for each operation mode of the electric fan 1. For example, the operation modes of the electric fan 1 includes "fan mode: strong" in which the wind velocity is high (e.g., 15 m/s), "fan mode: medium" in which the wind velocity is medium (e.g., 10 m/s), "fan mode: weak" in which the wind velocity is low (e.g., 4 m/s), and the like. The surface-processed structure 201 is designed for two target flows corresponding to two operation modes of the plurality of operation modes.

The surface-processed structure 201 has the fine groove 520 and the block clearance 550 as two types of grooves for controlling air flows. The fine groove 520 is designed for the faster target flow of the two target flows. The block clearance 550 is designed for the slower target flow of the two target flows. As a result, the surface-processed structure 201 can smoothly send out the air flow in the same manner as in the above-described embodiment regardless of which of the two operation modes the electric fan 1 is executing.

Figure 10A:
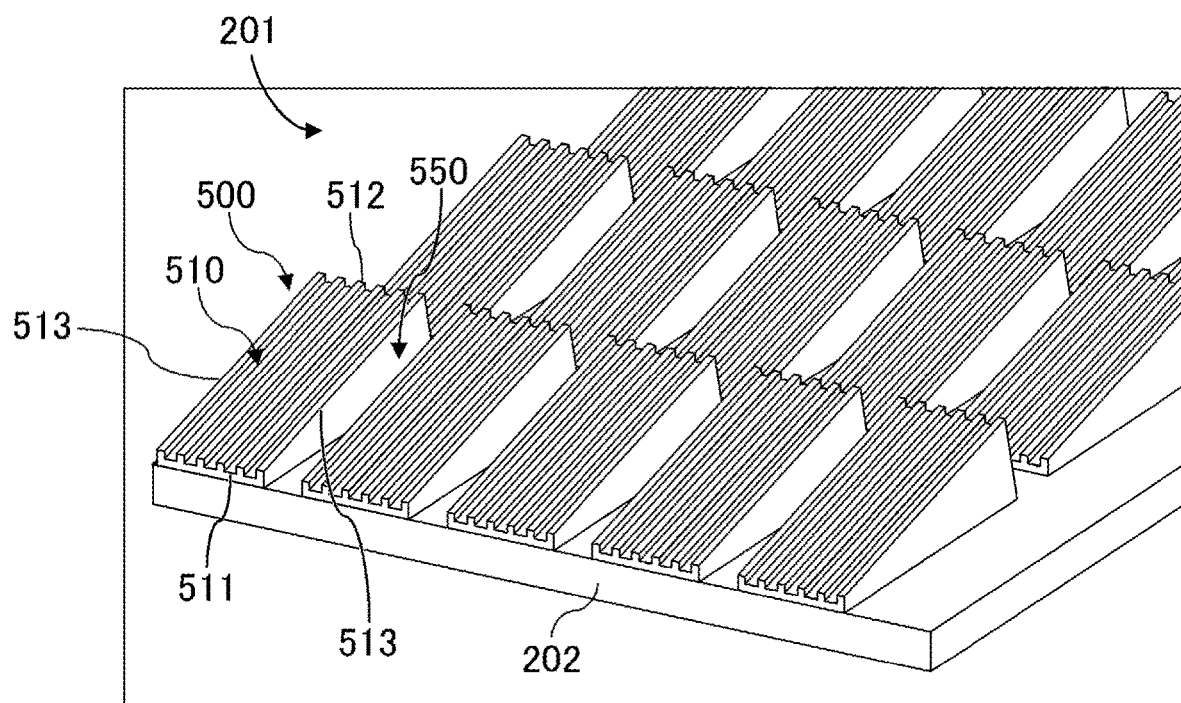
FIG. 10A is a perspective view of a surface-processed sheet according to Example 1.
Figure 10A:
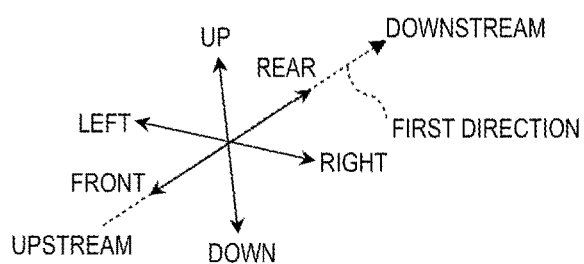
Figure 10D:
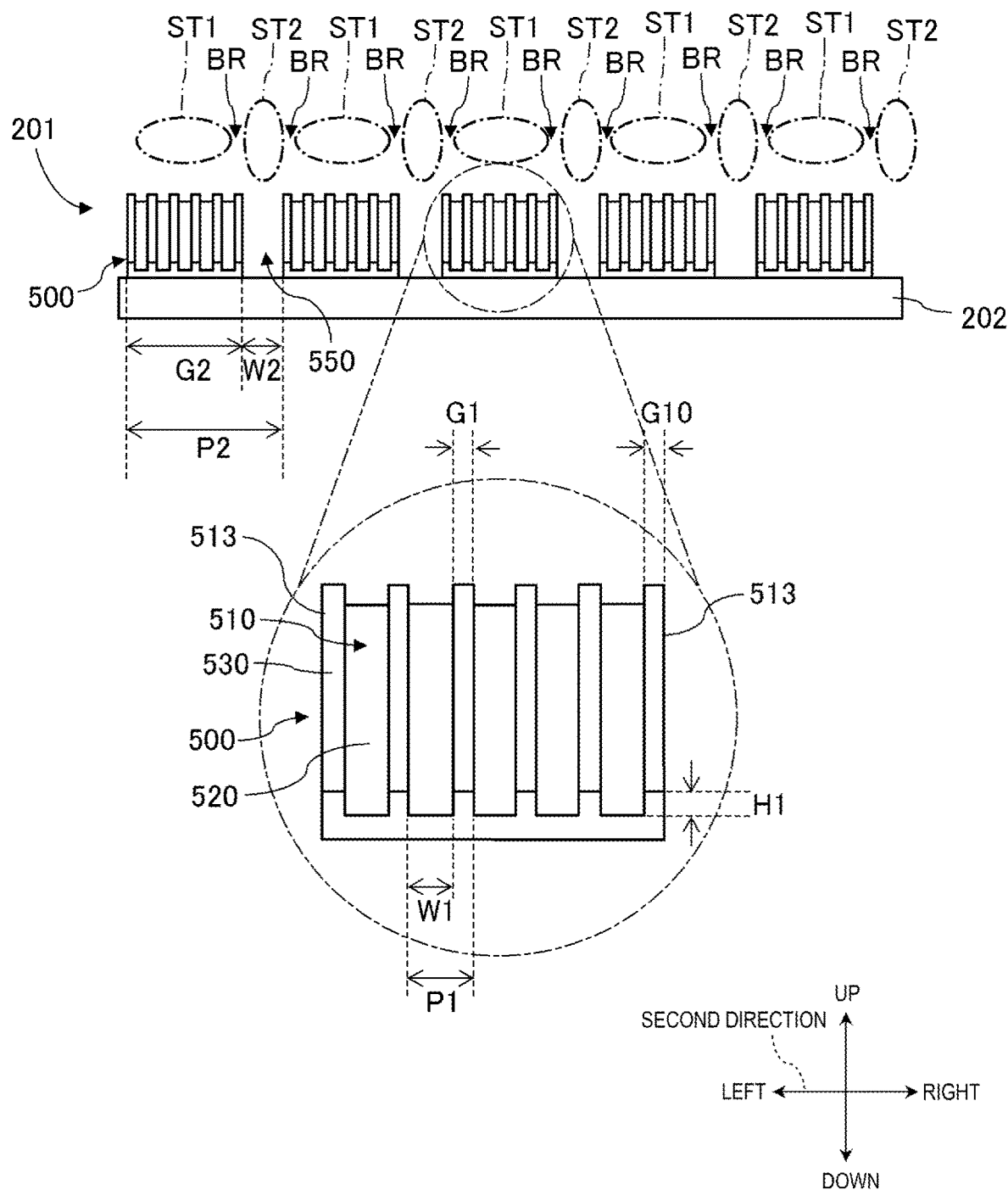
FIG. 10D is a front view of the surface-processed sheet according to Example 1.
Figure 10E:
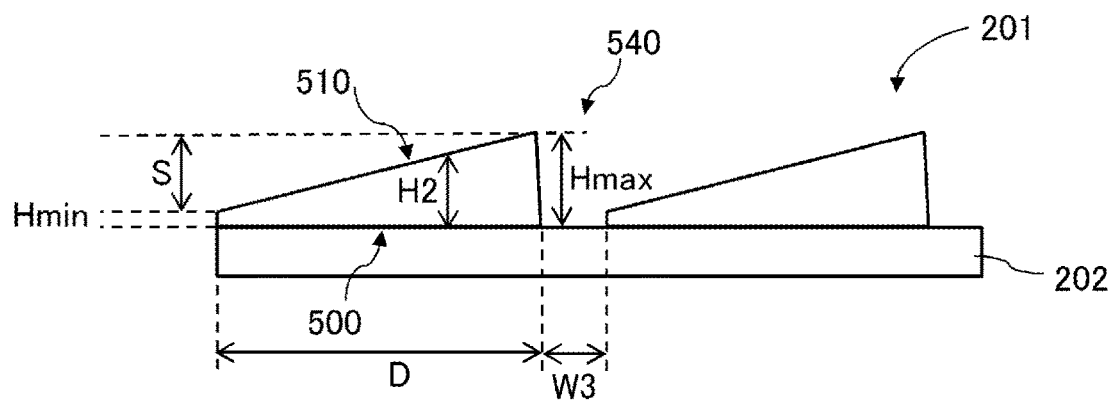
FIG. 10E is a side view of the surface-processed sheet according to Example 1.
Figure 10E:
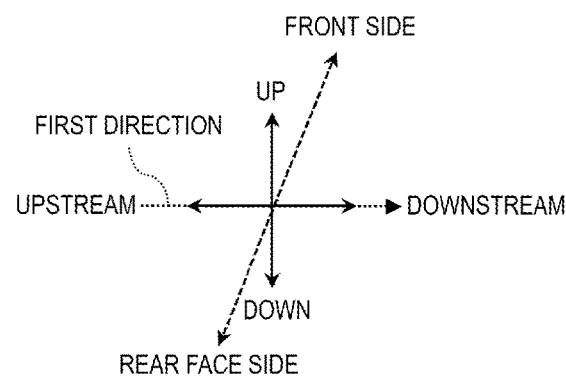

A design example of a surface-processed structure 201 in Example 1 will be described. FIG. 10A is a perspective view of a surface-processed sheet 200 according to Example 1. FIG. 10B is a table showing a relationship between the surface-processed sheet 200 and target flows according to Example 1. FIG. 10C is a table showing dimensions of the surface-processed sheet 200 according to Example 1. FIG. 10D is a front view of the surface-processed sheet 200 according to Example 1. FIG. 10E is a side view of the surface-processed sheet 200 according to Example 1.

Example 1

The surface-processed structure 201 of Example 1 has a basic structure similar to that of the above-described embodiment as illustrated in FIG. 10A. The surface-processed structure 201 of the present example is designed in the following procedure with the air flow of "fan mode: strong" (flow rate of 15 m/s) and the air flow of "fan mode: weak" (flow rate of 4 m/s) as the target flows among operation modes of the electric fan 1 as shown in FIG. 10B.
First Step (Determination of Target Value of Pitch P Corresponding to Fast Target Flow)

A target value of a pitch P for forming grooves is determined in accordance with the target flow having a higher flow rate of the two target flows. In this example, the target value of a pitch P1 of the fine groove 520 is determined in accordance with the air flow of "fan mode: strong". The pitch P1 is equal to the sum of the groove width W1 of one fine groove 520 and the length of one protruding portion 530 in the second direction (i.e., the groove spacing G1) as illustrated in FIG. 10D.

As an example, the target value of the pitch P can be calculated by the following (Expression 1) based on the relationship with the target flow.

$$P=P'*v/u \qquad \text{(Expression 1)}$$

In (Expression 1), P' is a dimensionless value of the pitch P, and in this example, P'=15 to 30.

v is a kinematic viscosity coefficient and, in this example, is a kinematic viscosity coefficient ($15.01 \times 10^{-6}$ (m/s)) at the air temperature of 20° C.

u is a friction velocity of the target flow in the surface-processed structure 201 and is a flow rate of 15 (m/s) of the "fan mode: strong" in the present example.

In this example, the target value of the pitch P1 of the fine groove 520 is calculated to be in the range of 15 to 30 (μm) based on (Expression 1) as shown in FIG. 10B.

Second Step (Determination of Target Value of Pitch P Corresponding to Slow Target Flow)

A target value of a pitch P for forming grooves is determined in accordance with the target flow having a lower flow rate of the two target flows. In this example, the target value of a pitch P2 of the block clearance 550 is determined in accordance with the air flow of "fan mode: weak". The pitch P2 is equal to the sum of the groove width W2 of one block clearance 550 and the length of one block 500 in the second direction (i.e., the groove spacing G2) as illustrated in FIG. 10D.

In this example, the target value of the pitch P2 of the block clearance 550 is calculated based on (Expression 1). In this case, u is the flow rate 4 (m/s) of "fan mode: weak". Accordingly, the target value of the pitch P2 of the block clearance 550 is calculated to be in the range of 56 to 112 (μm) as shown in FIG. 10B.

Third Step (Determination of Number of Fine Grooves 520)

The number of fine grooves 520 provided in each block 500 is determined. The number of fine grooves 520 provided in each block 500 is at least three, and more preferably five or more. In the present example, five fine grooves 520 are provided in each block 500 as illustrated in FIG. 10D.

Fourth Step (Determination of Size of Fine Groove 520)

The groove width W1 of the respective fine grooves 520 are determined. One fine groove 520 and one protruding portion 530 are arranged side by side in the second direction in one pitch P1 as illustrated in FIG. 10D. Here, when the groove width W1 is relatively great and the groove spacing G1 is relatively narrow, the proportion of the fine grooves 520 on the inclined surface 510 of the block 500 increases, and thus it is easy to reduce the frictional resistance against the flow of the fluid. From such a viewpoint, the groove width W1 is greater than the groove spacing G1. In other words, the width of each of the plurality of fine grooves 520 in the second direction is greater than the width of each of the plurality of protruding portions 530 in the second direction.

The plurality of protruding portions 530 provided in each block 500 includes two first protruding portions constituting both end portions 513 of the top face of the block 500 in the second direction and a plurality of second protruding portions different from the two first protruding portions. In other words, the plurality of second protruding portions are arranged between the two first protruding portions. Above each of the first protruding portions, a boundary region BR sandwiched between the mainstream ST1 and the sub-stream ST2 is formed. The boundary region BR is a region in which a flow rate changes in the second direction to switch between the mainstream ST1 and the sub-stream ST2. The boundary region BR hinders the mainstream ST1 and the sub-stream ST2 from interfering with each other and allows the entire air flow to stably flow.

Here, in order for the mainstream ST1 and the sub-stream ST2 to stably flow without meandering, it is preferable to generate momentum diffusion of each air flow. To efficiently generate this momentum diffusion, it is preferable that flow rates rapidly change between the mainstream ST1 and the sub-stream ST2 in the boundary region BR, and thus narrow boundary region BR is preferred. A size of the boundary region BR depends on a size of a wall width G10, which is the length of each first protruding portion in the second direction. From this viewpoint, the wall width G10 is less than the groove width W1 of the fine groove 520.

On the other hand, since the first protruding portion is a part of the wall portion forming the fine groove 520, if the thickness of each first protruding portion is too small, there is concern that durability may be impaired or it may be difficult to accurately manufacture the first protruding portion. From this viewpoint, the wall width G10 is equal to or greater than the thicknesses of the second protruding portion (groove spacing G1). That is, the width of each of the two first protruding portions in the second direction is equal to or greater than the width of each of the plurality of second protruding portions in the second direction.

In the present example, it is assumed that the pitch P1 is determined to be 15 (μm) within the range of 15 to 30 (μm) which is the target value of the pitch P1 determined in the first step. Based on this, it is assumed that the groove width W1 is determined to be 10 (μm) and the groove spacing G1 is determined to be 5 (μm). It is assumed that the wall width G10 is determined to be 5 (μm) as the groove spacing G1.

Here, to reduce the frictional resistance against the air flow, the aspect ratio of each groove (that is, the ratio of the height H to the groove width W) is suitably designed. The grooves to be designed in this example are the fine groove 520 and the block clearance 550. The height H can be calculated by using the following (Expression 2).

$$H=H'*v/u \qquad \text{(Expression 2)}$$

In (Expression 2), H' is a dimensionless value of the height H. v and u are a kinematic viscosity coefficient and a friction velocity, respectively, as in (Expression) 1.

The aspect ratio of the groove (i.e., the height H/the groove width W) is in the range of 0.5 to 0.7 from the viewpoint of reducing the fluid resistance.

In the present example, the groove shape, which is the shape of a longitudinal section of the fine groove 520, is a square shape forming a rectangle when viewed from the first direction. It is assumed that the aspect ratio (i.e., the height H/the groove width W1) of the fine groove 520 is determined to be 0.5 to reduce the frictional resistance of the air flow flowing along the fine groove 520 as shown in FIG. 10C. When the groove width W1 of the fine groove 520 is determined, the height H1 of the fine groove 520 can be calculated by multiplying the groove width W1 by 0.5. Since the groove width W1 is 10 (μm), the height H1 is determined to be 5 (μm).

Fifth Step (Determination of Size of Block Clearance 550)

When the number of fine grooves 520, the groove width W1, the groove spacing G1, and the wall width G10 are determined to be described above, the length of the block 500 in the second direction (i.e., the groove spacing G2) can be calculated. In the present example, the groove spacing G2 is determined to be 80 (μm) corresponding to five fine grooves 520 and six protruding portions 530 provided in the block 500 as shown in FIG. 10C.

Furthermore, a value satisfying the following first condition and second condition is determined to be the pitch P2 within the range of 56 to 112 (μm), which is the target value of the pitch P2 determined in the second step.

The first condition will be described. The pitch P2 is a value satisfying the condition "the groove width W2 of the block clearance 550 is larger than the groove width W1 of the fine groove 520". This condition is synonymous with the condition that the width of each of the plurality of fine grooves 520 in the second direction is less than the width of the block clearance 550 in the second direction. The groove width W2 corresponds to the difference between the pitch P2 and the groove spacing G2. That is, the pitch P2 may be a value greater than the sum of the groove spacing G2 and the groove width W1.

When the pitch P2 satisfies the first condition, a flow rate difference is likely to be made between the mainstream ST1 caused by the fine groove 520 and the sub-stream ST2 caused by the block clearance 550. In the present example, since the groove spacing G2 of the block clearance 550 is 80 (μm) and the groove width W1 of the fine groove 520 is 10 (μm), the pitch P2 may be larger than 90 (μm).

The second condition will be described. The pitch P2 is a value satisfying a condition "the groove width W2 of the block clearance 550 is narrower than the sum of the groove widths W1 of the plurality of fine grooves 520 provided in one block 500". This condition is synonymous with the condition that the width of the block clearance 550 in the second direction is less than the sum of the widths of the plurality of fine grooves 520 in the second direction. That is, the pitch P2 may be less than the sum of the groove spacing G2 and the sum of the groove widths W1 of the respective fine grooves 520 in one block 500.

When the pitch P2 satisfies the second condition, the region width of the mainstream ST1 can be made greater than the region width of the sub-stream ST2, and the surface-processed structure 201 effective in the high speed range can be achieved as a whole. In the present example, since there are five fine grooves 520 and the groove width W1 is 10 (μm), the sum of the groove widths W1 of the respective fine grooves 520 is 50 (μm). The pitch P2 may be less than 130 (μm) obtained by adding 80 (μm) which is the groove spacing G2 to the sum of the groove widths W1.

Thus, the range of the target value of the pitch P2 satisfying the first condition and the second condition is 90 to 112 (μm) in the present example. Although the pitch P2 may be determined within this range, it is assumed that the pitch P2 is determined to be 112 (μm) as shown in FIG. 10C. In this case, the groove width W2 of the block clearance 550 is 32 (μm).

Sixth Step (Determination of Aspect Ratio of Block Clearance 550)

The aspect ratio (that is, the height H2/the groove width W2) of a block clearance 550 may also be 0.5 to 0.7 from the viewpoint of reducing the fluid resistance as described above. Here, since the top face of the block 500 is the inclined surface 510, the height H2 of the block 500 increases in the first direction as illustrated in FIG. 10E.

Accordingly, the aspect ratio of the block clearance 550 also gradually increases from upstream toward downstream in the first direction. That is, unlike the fine groove 520, the aspect ratio of the block clearance 550 changes in the first direction.

To reduce the frictional resistance of the block clearance 550, the aspect ratio of the block clearance 550 at the upstream end portion may be 0.5 or less and the aspect ratio of the block clearance 550 at the downstream end portion may be 0.7 or more. That is, the aspect ratio of the block clearance 550 increases in the first direction to across the range of 0.5 to 0.7. The height H2 of the block 500 is be determined to satisfy this condition.

In the present example, the aspect ratio of the block clearance 550 at the upstream end portion is determined based on the above-described groove width W2 (32 μm) and the height H2 (i.e., the minimum value Hmin) of the upstream end portion 511 of the block 500. The minimum value Hmin of the block 500 is 16 (μm) or less so that the aspect ratio is 0.5 or less. On the other hand, the aspect ratio of the block clearance 550 at the downstream end portion is determined based on the above-described groove width W2 (32 μm) and the height H2 (i.e., the maximum value Hmax) of the downstream end portion 512 of the block 500. The maximum value Hmax of the block 500 is 22.4 (μm) or more so that the aspect ratio is 0.7 or more.

However, if the aspect ratio of the block clearance 550 is excessively large or small, there would be concern that the function of the block clearances 550 cannot be sufficiently exhibited. For this reason, the lower limit of the aspect ratio of the block clearance 550 may be set to 0.3 and the upper limit thereof may be set to 2.5. In the present example, it is assumed that the minimum value Hmin of the block 500 is determined to be 10 (μm) so that the aspect ratio of the block clearance 550 at the upstream end portion is about 0.3. It is assumed that the maximum value Hmax of the block 500 is determined to be 60 (μm) so that the aspect ratio of the block clearance 550 at the downstream end portion is about 1.85. Thus, the aspect ratio of the block clearance 550 increases from about 0.3 to about 1.85 in the first direction as shown in FIG. 10C.

In the block 500 described above, the height difference S of the inclined surface 510 is the difference between the maximum value Hmax and the minimum value Hmin, that is, 50 (μm). As described above, the inclination angle α of the inclined surface 510 is determined based on the height difference S and the depth D of the inclined surface 510. That is, the depth D of the inclined surface 510 may be determined based on the height difference S and the inclination angle α of the inclined surface 510. Although the inclination angle α may be determined in the range of 6 degrees to 27 degrees, it is assumed in the present example that the inclination angle α is determined to be 14 degrees and the depth D is determined to be 100 (μm). In this case, since the depth D is greater than the height H2 and the groove spacing G2, the block 500 is elongated in the first direction in which the air flow flows. Furthermore, the height difference S of the inclined surface 510 and the aspect ratio of the block clearance 550 may be suitably designed by adjusting the inclination angle α and/or the depth D.

Seventh Step (Determination of Size of Clearance 540)

A groove-shaped clearance 540 extending in the second direction is formed between two blocks 500 adjacent to each other in the first direction among the plurality of blocks 500 as illustrated in FIG. 10E. The clearance 540 is provided between two blocks 500 adjacent to each other in the first direction. When the groove width W3 of the clearance 540 and the height difference S of the inclined surface 510 are substantially equal, the air vortex E (see FIG. 9B) is likely to be effectively generated. For example, when the groove width W3 is set to be in the range of 0.75 to 1.25 times the height difference S, the groove width W3 and the height difference S are substantially equal.

Therefore, in the present example, the groove width W3 is determined to be 40 (μm) which is substantially equal to the height difference S (50 μm) as shown in FIG. 10C. That is, the height difference S of the block 500 upstream in the first direction among the two blocks 500 is substantially equal to the width of the groove-shaped clearance 540 in the first direction.

Examples of Creation and Use of Surface-Processed Structure 201

A surface-processed structure 201 in which a plurality of blocks 500 are two-dimensionally arranged is produced based on the design values (see FIG. 10C) determined in the first to seventh steps described above. In the surface-processed structure 201 produced as described above, the plurality of fine grooves 520 are each arranged at a first pitch corresponding to a first flow rate that is relatively higher one of two different flow rates. The plurality of block clearances 550 are each arranged at a second pitch corresponding to a second flow rate that is relatively lower one of the two different flow rates. In the present example, the first pitch corresponding to the first flow rate is the pitch P1 corresponding to the high-speed air flow of "fan mode: strong". The second pitch corresponding to the second flow rate is the pitch P2 corresponding to the low-speed air flow of "fan mode: weak".

When the surface-processed sheet 200 including the surface-processed structure 201 is attached to, for example, the blade 120 of the electric fan 1, the following effects are exhibited. When the operation mode of the electric fan 1 is "fan mode: strong", a high-speed target flow flows along the surface-processed structure 201. Since each fine groove 520 is designed in accordance with the high-speed target flow, an air layer is effectively formed by each fine groove 520, and the contact resistance against the mainstream ST1 is greatly reduced. On the other hand, when the operation mode of the electric fan 1 is "fan mode: weak", a low-speed target flow flows along the surface-processed structure 201. Since each of the block clearances 550 is designed in accordance with the low-speed target flow, an air layer is effectively formed by each of the block clearances 550, and the contact resistance against the sub-stream ST2 is significantly reduced.

Since the surface-processed structure 201 is designed in accordance with the two operation modes of the electric fan 1 as described above, the contact resistance against at least one of the mainstream ST1 and the sub-stream ST2 is significantly reduced in a case where the operation mode is either "fan mode: strong" or "fan mode: weak". Thus, the air flow including the mainstream ST1 and the sub-stream ST2 flows smoothly along the surface-processed structure 201 as a whole. Such a surface-processed structure 201 can exhibit a friction reducing effect over a wide flow rate range of the inflowing air.

Design of End Portion of Block 500

As described above, to stabilize the mainstream ST1 and the sub-stream ST2, it is preferable to generate the momentum diffusion of each air flow. To generate such momentum diffusion, it is preferable that the flow rate difference between the mainstream ST1 and the sub-stream ST2 be large. To achieve this, the height difference between the top face of the block 500 and the bottom face of the block clearance 550 adjacent to each other may be increased. In particular, since the block clearance 550 and the block 500 are arranged in the second direction, the height difference between the top face of the block 500 and the bottom face of the block clearance 550 may be increased at the boundary on which the block 500 and the block clearance 550 are adjacent to each other.

From this viewpoint, both end portions 513 of the top face of the block 500 in the second direction are located above the bottoms of the plurality of fine grooves 520 in a cross section of the block 500 extending along a plane perpendicular to the first direction. In other words, in the longitudinal section obtained by cutting a block 500 perpendicularly to the first direction, each of both end portions 513 is located at a position higher than the bottoms of the plurality of fine grooves 520. Each of both end portions 513 is a bank-like structure that separates the fine groove 520 from the block clearance 550 on the top face of the block 500.

If the two first protruding portions described above are not provided on the top face of the block 500, the height of each of the both end portions 513 is equal to or lower than the bottom of the fine groove 520. In this case, the height difference at the boundary between the block 500 and the block clearance 550 is smaller than that when both end portions 513 are located at a position higher than the bottom of the fine groove 520. In other words, the effect of increasing the flow rate difference between the mainstream ST1 and the sub-stream ST2 may be weakened.

In the present example, the top end surfaces of the plurality of protruding portions 530 constitute the outer surface of the block 500. The outer surface of the block 500 is an imaginary surface extending along the highest portion of the top face of the block 500. Both end portions 513 of the top face of the block 500 in the second direction are at the same height as the outer surface. In other words, each of both end portions 513 is included in the top end surface of the corresponding one of the first protruding portions at both ends of the block 500 in the second direction. Thus, the mainstream ST1 can smoothly flow along the flat outer surface of the block 500 while increasing the height difference at the boundary between the block 500 and the block clearance 550.

Furthermore, since the top face of the block 500 is the inclined surface 510, it is possible to improve the flow rate of the mainstream ST1 and to further increase the flow rate difference between the mainstream ST1 and the sub-stream ST2. Alternatively, the top face of the block 500 may be flat surface extending in the first direction and the second direction, for example. Also in this case, the plurality of fine grooves 520 are provided on the top face of each block 500, and the block clearance 550 is provided between two adjacent blocks 500, and thus the same effects as described above are achieved.

Example 2

Figure 11A:
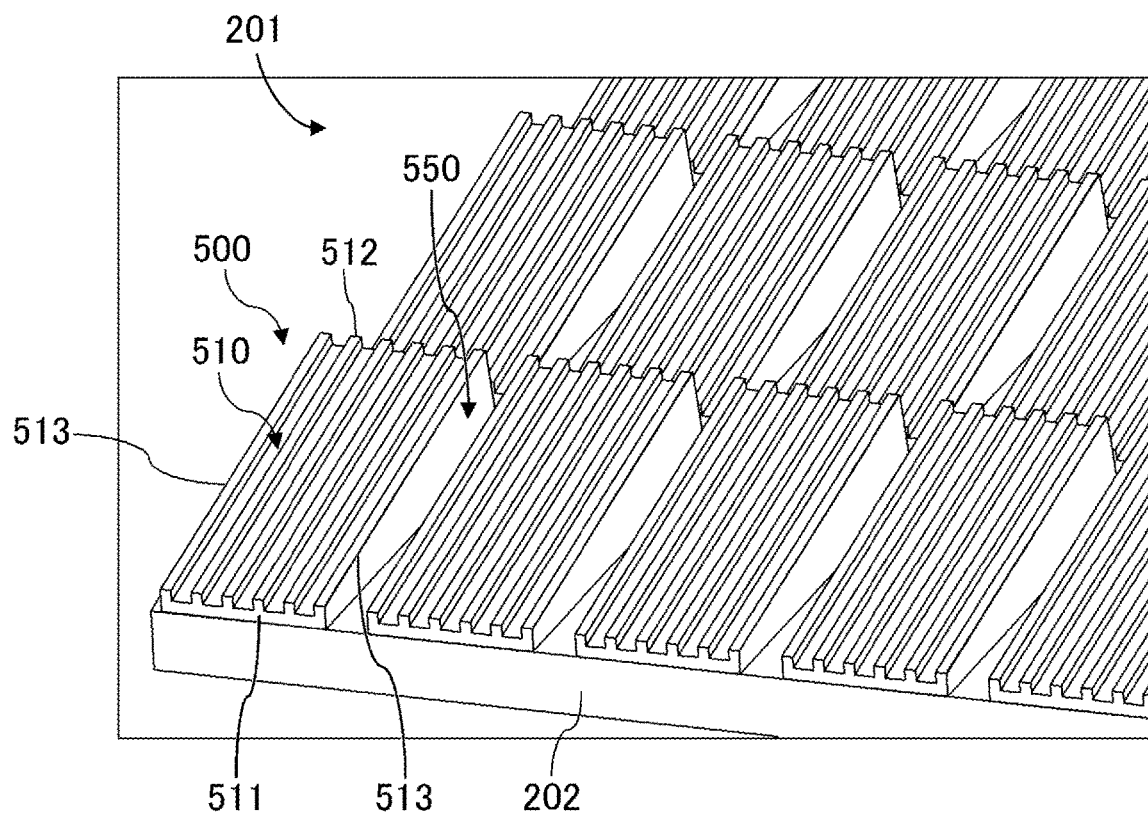
FIG. 11A is a perspective view of a surface-processed sheet according to Example 2.
Figure 11A:
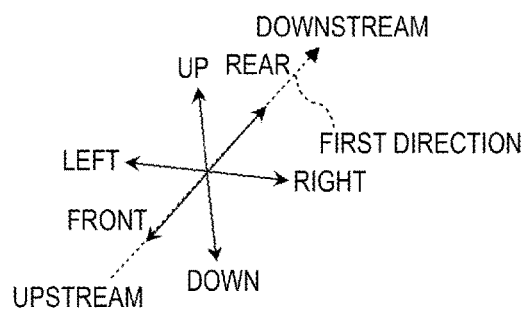

A design example of the surface-processed structure 201 in Example 2 will be described. FIG. 11A is a perspective view of a surface-processed sheet 200 according to Example 2. FIG. 11B is a table showing a relationship between the surface-processed sheet 200 and a target flow according to Examples 2 and 3. FIG. 11C is a table showing dimensions of the surface-processed sheet 200 according to Examples 2 and 3. Hereinafter, differences from Example 1 will be described.

A surface-processed structure 201 of Example 2 has a basic structure similar to that of the above-described embodiment as illustrated in FIG. 11A. The surface-processed structure 201 of the present example is designed in a similar procedure to that of Example 1 with the air flow of "fan mode: strong" (flow rate of 15 m/s) and the air flow of "fan mode: medium" (flow rate of 10 m/s) as target flows among the operation modes of the electric fan 1 as shown in FIG. 11B.

First Step (Determination of Target Value of Pitch P Corresponding to Fast Target Flow)

Similarly to Example 1, a target value of a pitch P1 of the fine groove 520 is calculated to be in the range of 15 to 30 (μm) in accordance with the air flow of "fan mode: strong".

Second Step (Determination of Target Value of Pitch P Corresponding to Slow Target Flow)

In this example, a target value of the pitch P2 of the block clearance 550 is determined in accordance with the air flow of "fan mode: medium". In this case, u in (Expression 1) is a flow rate of 10 (m/s) in "fan mode: medium". Accordingly, the target value of the pitch P2 is calculated to be in the range of 22 to 45 (μm) as shown in FIG. 11B.

Third Step (Determination of Number of Fine Grooves 520)

As in Example 1, five fine grooves 520 are provided in each block 500.

Fourth Step (Determination of Size of Fine Groove 520)

As in Example 1, the number of the fine grooves 520, a groove width W1, a groove spacing G1, and a wall width G10 are determined (see FIG. 11C). The groove shape of the fine groove 520 is rectangle as in Example 1.

Fifth Step (Determination of Size of Block Clearance 550)

As in Example 1, the groove spacing G2 is determined to be 80 (μm) corresponding to five fine grooves 520 and six protruding portions 530 provided in the block 500. However, the groove spacing G2 is larger than 22 to 45 (μm) which is the target value of the pitch P2. When the flow rate difference between two target flows is relatively small as described above, the groove spacing G2 (that is, the size of the block 500) may exceed the target value of the pitch P2, and the block clearance 550 may not be arranged within the target value of the pitch P2.

In this case, a groove width W2 of the block clearance 550 is determined by multiplying the groove width W1 of a fine groove 520 by predetermined value. The predetermined value may be, for example, in the range of one to five (however, one is excluded). In the present example, it is assumed that 20 (μm) obtained by multiplying the groove width W1 by two is determined to be the groove spacing G2 as shown in FIG. 11C. Thus, 100 (μm) obtained by adding the groove spacing G2 to the groove width W2 is determined to be the pitch P2.

Sixth Step (Determination of Aspect Ratio of Block Clearance 550)

As in Example 1, the height H2 of the block 500 may be determined such that the aspect ratio of the block clearance 550 increases in the first direction to across the range of 0.5 to 0.7.

In the present example, it is assumed that the minimum value Hmin of the block 500 is determined to be 10 (μm) so that the aspect ratio of the block clearance 550 at the upstream end portion is about 0.5. It is assumed that the maximum value Hmax of the block 500 is determined to be 45 (μm) so that the aspect ratio of the block clearance 550 at the downstream end portion is about 2.2. Thus, the aspect ratio of the block clearance 550 increases from about 0.5 to about 2.2 in the first direction as shown in FIG. 11C.

In the block 500 described above, the height difference S of the inclined surface 510 is the difference between the maximum value Hmax and the minimum value Hmin, that is, 35 (μm). In the present example, it is assumed that the inclination angle α is determined to be 10 degrees and the depth D is determined to be 200 (μm).

Seventh Step (Determination of Size of Clearance 540)

In this example, the groove width W3 is determined to be 30 (μm) which is substantially equal to the height difference S (35 μm).

Examples of Creation and Use of Surface-Processed Structure 201

A surface-processed structure 201 in which a plurality of blocks 500 are two-dimensionally arranged is produced based on the design values (see FIG. 11C) determined in the first to seventh steps described above. In the surface-processed structure 201 of the present example, a plurality of fine grooves 520 are each arranged at a first pitch corresponding to a first flow rate, and a plurality of block clearances 550 are each arranged at a second pitch corresponding to a second flow rate. The first pitch corresponding to the first flow rate is the pitch P1 corresponding to the high-speed air flow of "fan mode: strong". The second pitch corresponding to the second flow rate is the pitch P2 corresponding to the medium-speed air flow of "fan mode: medium". In this case, the surface-processed structure 201 can exhibit the friction reducing effect over a wide flow rate range of the inflowing air as in Example 1. Furthermore, design of the end portions of the block 500 is similar to that of Example 1.

Example 3

Figure 12A:
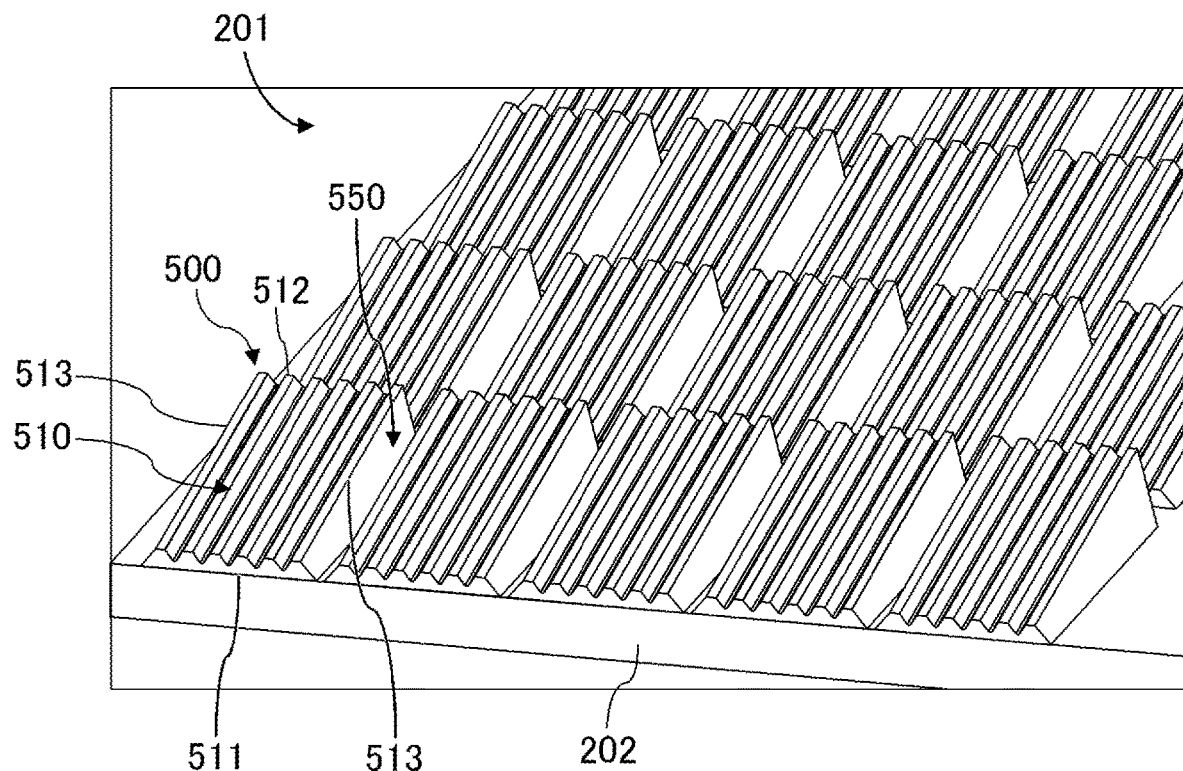
FIG. 12A is a perspective view of the surface-processed sheet according to Example 3.
Figure 12A:
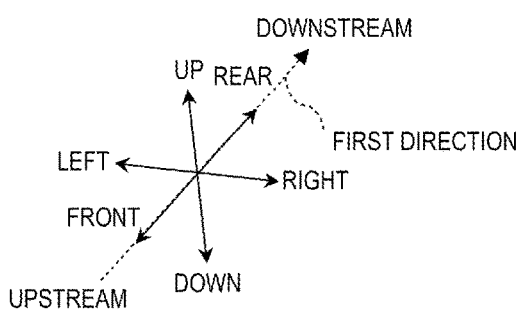
Figure 12B:
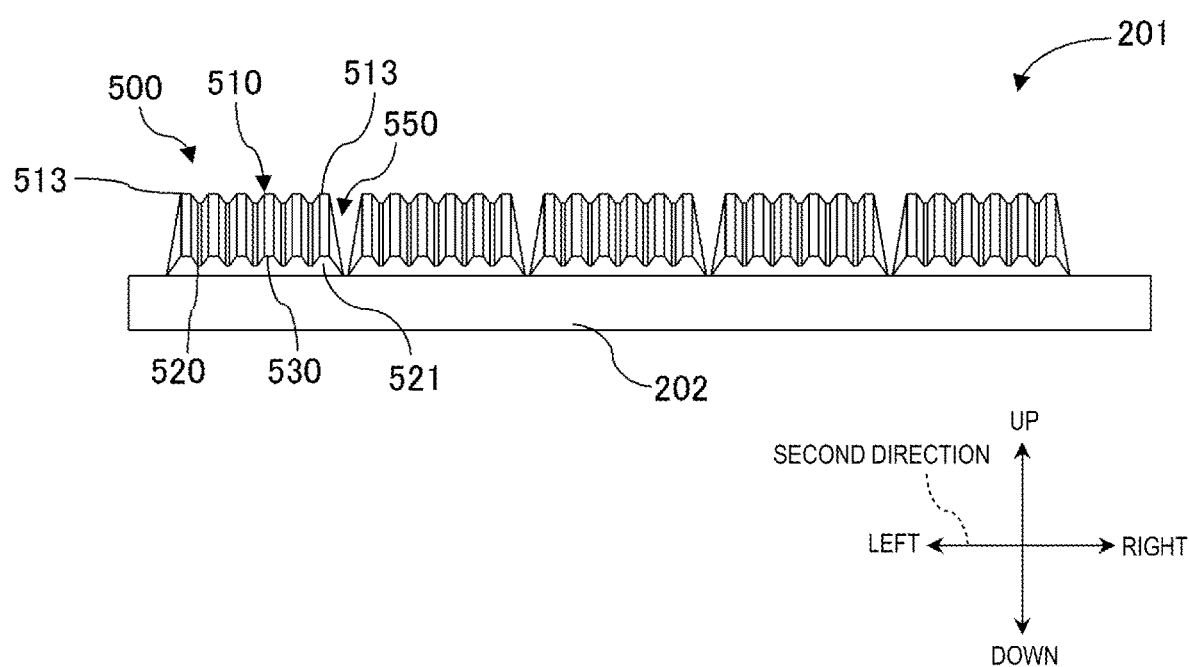
FIG. 12B is a front view of the surface-processed sheet according to Example 3.
Figure 12C:
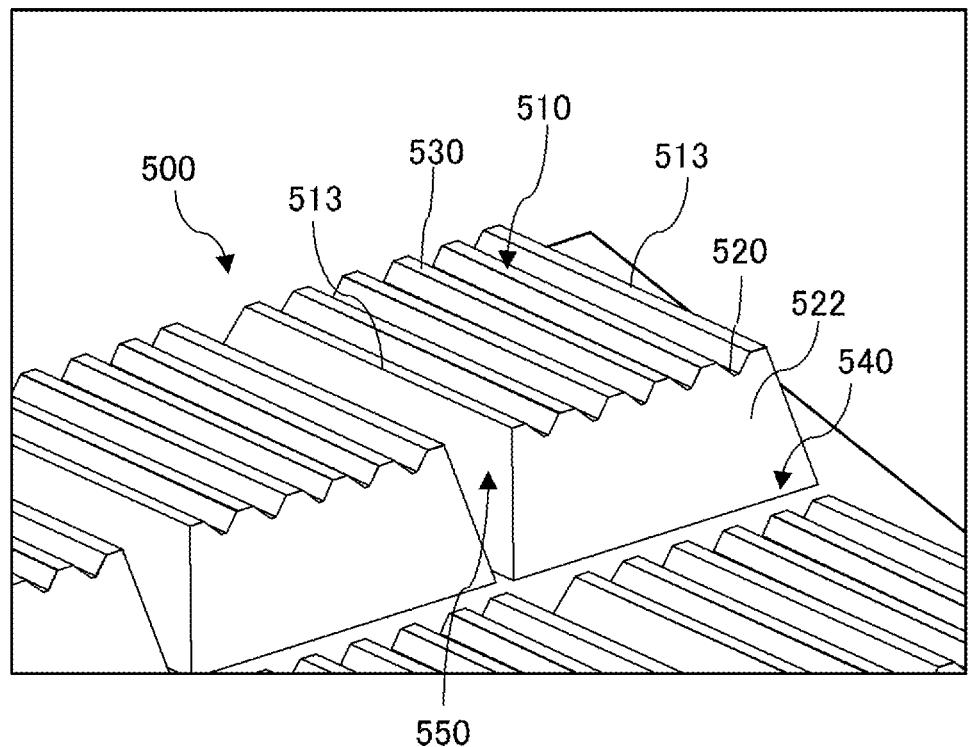
FIG. 12C is an enlarged perspective view of a block of Example 3 viewed from a downstream side.

A design example of the surface-processed structure 201 in Example 3 will be described. FIG. 12A is a perspective view of a surface-processed sheet 200 according to Example 3. FIG. 12B is a front view of the surface-processed sheet 200 according to Example 3. FIG. 12C is an enlarged perspective view of a block 500 of Example 3 viewed from the downstream side. Hereinafter, differences from Example 1 will be described.

Although the surface-processed structure 201 of Example 3 has a basic structure similar to that of the above-described embodiments, it differs therefrom in that the groove shape of the fine groove 520 is a V shaped as illustrated in FIG. 12A. The groove width W1 of the V-shaped fine groove 520 gradually decrease downward. The surface-processed structure 201 of the present example is designed in a similar procedure to that of Example 2 with the air flow of "fan mode: strong" (flow rate of 15 m/s) and the air flow of "fan mode: medium" (flow rate of 10 m/s) as target flows among the operation modes of the electric fan 1 as in Example 2 (see FIG. 11B). As a result, design values similar to those of Example 2 are determined (see FIG. 11C). The surface-processed structure 201 can exhibit the friction reducing effect over a wide flow rate range of the inflowing air as in Example 2.

Since the top face of each block 500 is the inclined surface 510 in the present example as in the above-described embodiments, the height H2 increases in the first direction. Both end portions 513 of the block 500 are at the same height as the outer surface of the block 500 and are each included in the top end surface of the corresponding one of the protruding portions 530 at both ends in the second direction. However, the block 500 of the present example have differences from those of the above-described embodiments as follows.

The fine groove 520 extend in the first direction with a constant groove width W1 on the inclined surface 510 as in the above-described embodiments. The block 500 has a trapezoidal shape in which the upper side is shorter than the lower side when viewed from the first direction, unlike in the above-described embodiments. Both side surfaces of the block 500 in the second direction extend obliquely downward from the corresponding both end portions 513 of the top face of the block 500. Furthermore, both side surfaces of the block 500 in the second direction each have an inclination angle relative to the base 202 increasing in the first direction. In other words, the inclination of each of the both side surfaces of the block 500 becomes steeper toward the first direction and closer to the vertical surface.

To be more specific, at the front face 521 facing the upstream direction of the block 500, the inclination angle of each of the side surfaces extending obliquely downward from the corresponding one of the both end portions 513 is about 45 degrees as illustrated in FIG. 12B. On the other hand, at the rear surface 522 facing the downstream direction of the block 500, the inclination angle of each of the side surfaces extending obliquely downward from the corresponding one of the both end portions 513 is about 80 degrees as illustrated in FIG. 12C. The inclination angle of each of the both side surfaces of the block 500 gradually increases from the front face 521 to the rear surface 522 of the block 500.

According to the above-described structure, even if the height H2 of the block 500 increases in the first direction, the length of the block 500 in the second direction (that is, the groove spacing G2) is constant. For this reason, the block 500 has a rectangular shape extending with a constant width in the first direction in a plan view as in the above-described embodiments.

If the inclination of each of the both side surfaces of the block 500 in the second direction is constant, the length of the block 500 in the second direction increases as the height H2 of the block 500 increases in the first direction. In this case, the block 500 has a trapezoidal shape expanding in the first direction in a plan view. Then, since the spacing between two blocks 500 adjacent to each other in the second direction (i.e., the groove width W2) becomes narrower in the first direction, the side surfaces of the blocks 500 may be connected to each other. In this case, the bottom face of the block clearance 550 may bulge upward at the portion where the two blocks 500 are connected to each other, and the height difference between the top face of the block 500 and the bottom face of the block clearance 550 may become small.

To deal with this problem, since the inclination of each of the both side surfaces of the block 500 becomes steeper in the first direction as described above in the present example, the spacing between two blocks 500 adjacent to each other in the second direction is constant. Therefore, since the two adjacent blocks 500 are hindered from being connected to each other, the height difference between the top face of the block 500 and the bottom face of the block clearance 550 can be increased to increase the difference in flow rate between the mainstream ST1 and the sub-stream ST2.

Remarks

The disclosure is not limited to the above-described embodiments and modified examples and can be subject to various modified examples within the scope of the claims, and an embodiment obtained by appropriately combining technical elements each disclosed in different embodiments falls also within the technical scope of the present invention. Furthermore, technical elements disclosed in the respective embodiments can be combined to provide a new technical feature.

Although the case where the surface-processed sheet 200 is provided in the propeller fan 100 of the electric fan 1 is exemplified in the above-described embodiments, the surface-processed sheet 200 is provided on a surface of a target object that comes into contact with a gas or a liquid that is a fluid. For example, if the surface-processed sheet 200 is provided in a fan of an outdoor unit of an air conditioner, air blowing can be efficiently achieved with reduced power consumption and noise. Furthermore, if the surface-processed sheet 200 is provided on the inner surface of a hose for discharging water or gas, the fluid flowing in the hose can be made to flow smoothly in a desired direction.

In the above-described embodiments, the surface-processed structure 201 is exemplified as being easily and accurately provided on the target object by installing the surface-processed sheet 200 on the target surface. Alternatively, the surface-processed structure 201 may be formed directly on a surface of a target object such as the propeller fan 100. At least one of the plurality of blocks 500 may not have the plurality of fine grooves 520 formed on the inclined surface 510.

Various aspects can be applied to the surface-processed structure 201. For example, the shape and arrangement of the plurality of blocks 500 can be variously modified as described below. FIGS. 13A to 13F are schematic side views of surface-processed sheets 200 according to first to sixth modified examples, respectively. FIGS. 14A to 14D are schematic plan views of surface-processed sheets 200 according to seventh to tenth modified examples, respectively. FIG. 15A is a schematic plan view of a surface-processed sheet 200 according to an eleventh modified example. FIG. 15B is a schematic front view of the surface-processed sheet 200 according to the eleventh modified example.

Figure 13A:
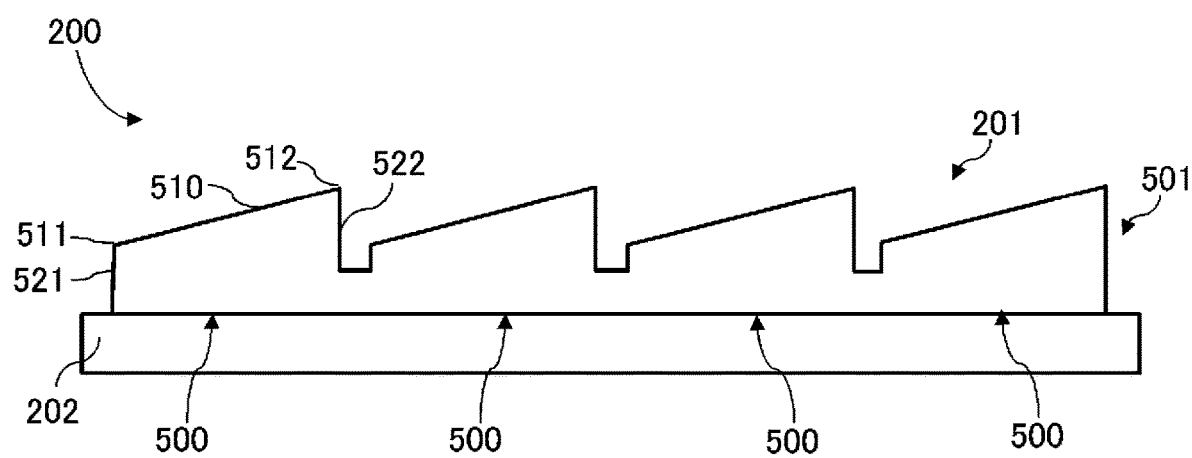
FIG. 13A is a schematic side view of a surface-processed sheet according to a first modified example.
Figure 13B:
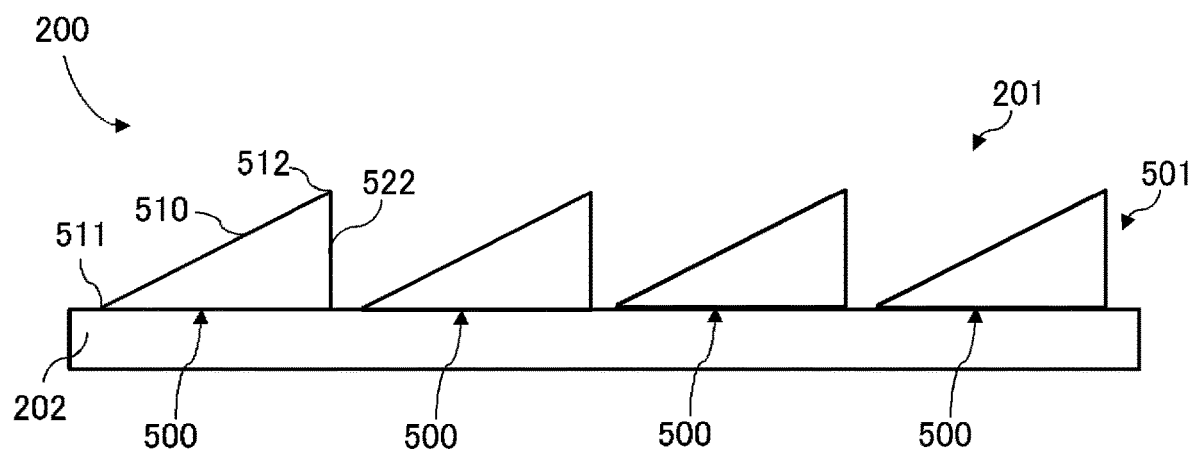
FIG. 13B is a schematic side view of a surface-processed sheet according to a second modified example.
Figure 13C:
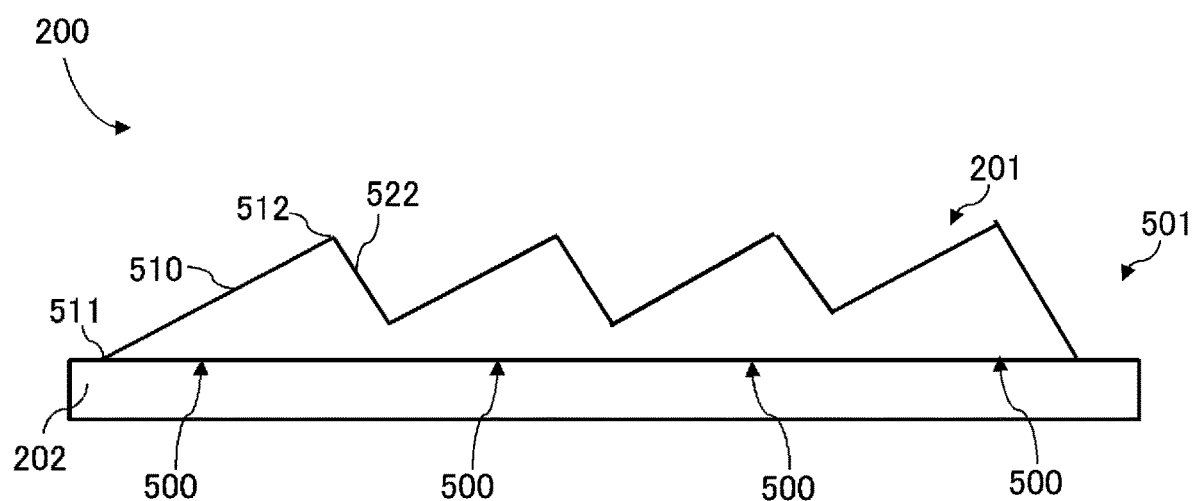
FIG. 13C is a schematic side view of a surface-processed sheet according to a third modified example.

Two or more blocks 500 arranged side by side in the first direction in each block column 501 may be connected to each other as illustrated in the first modified example of FIG. 13A. The upstream end portion 511 may be provided on the base 202 so that each of the plurality of blocks 500 has a triangular shape in a side view as illustrated in the second modified example of FIG. 13B. Two or more blocks 500 arranged side by side in the first direction in each block column 501 may have a mountain shape continuing in the first direction in a side view as illustrated in the third modified example of FIG. 13C.

Figure 13D:
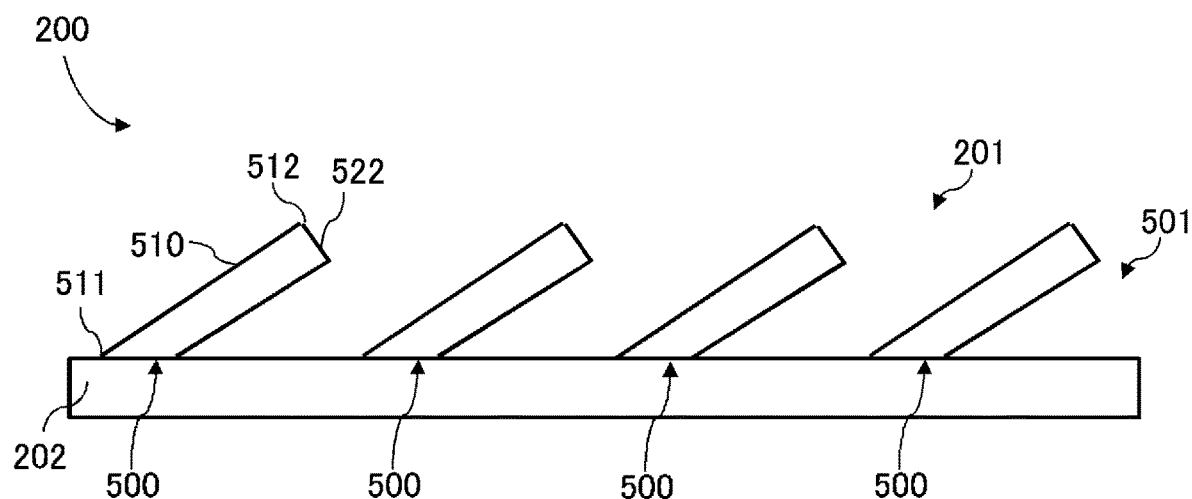
FIG. 13D is a schematic side view of a surface-processed sheet according to a fourth modified example.
Figure 13E:
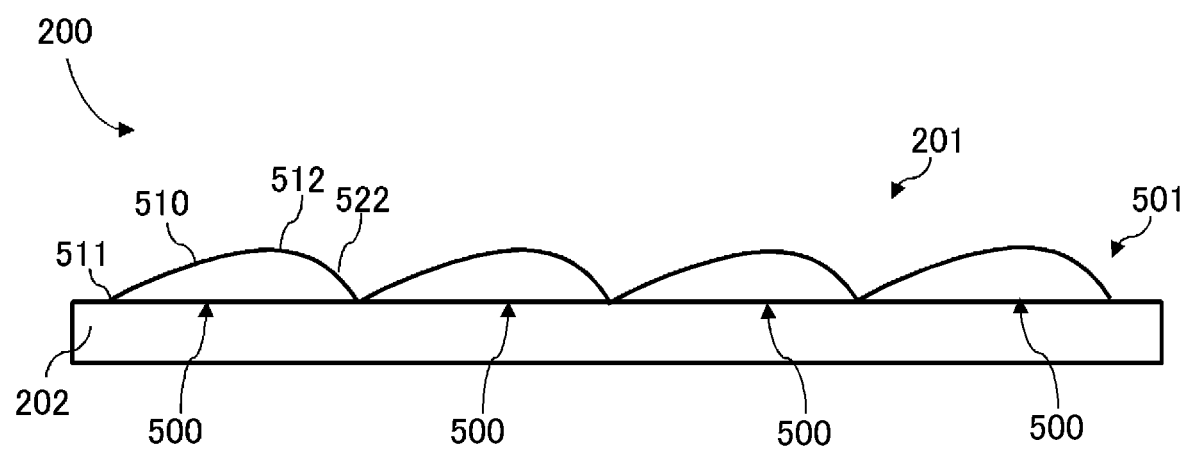
FIG. 13E is a schematic side view of a surface-processed sheet according to a fifth modified example.
Figure 13F:
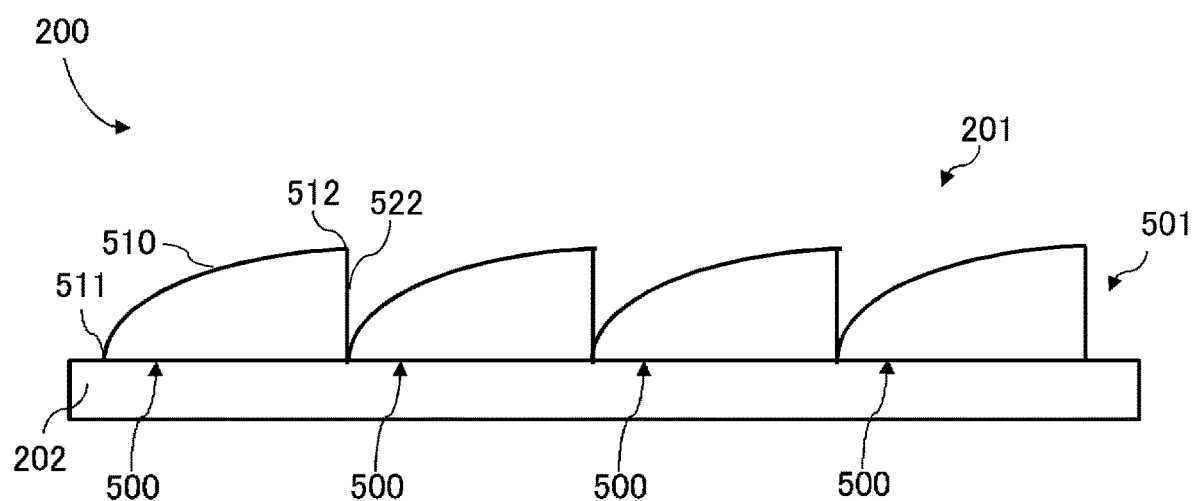
FIG. 13F is a schematic side view of a surface-processed sheet according to a sixth modified example.

Each of the plurality of blocks 500 may have a plate shape extending obliquely upward in the first direction from the base 202 as illustrated in the fourth modified example of FIG. 13D. Each of the plurality of blocks 500 may have an arc-like raised shape or a parabolic raised shape in a side view on the base 202 as illustrated in the fifth modified example of FIG. 13E. In each of the plurality of blocks 500, the inclined surface 510 may be curved in an arc shape or a parabolic shape in a side view as illustrated in the sixth modified example of FIG. 13F.

Furthermore, the inclined surface or the curved surface extending from the upstream end portion 511 at the front end of the block 500 to the downstream end portion 512 at the top end of the block 500 in each of the third to fifth modified examples (see FIGS. 13C to 13E) functions as the inclined surface 510. In this case, the inclined surface or the curved surface extending from the downstream end portion 512 to the rear end of the block 500 forms the rear surface 522 of the block 500.

Figure 14A:
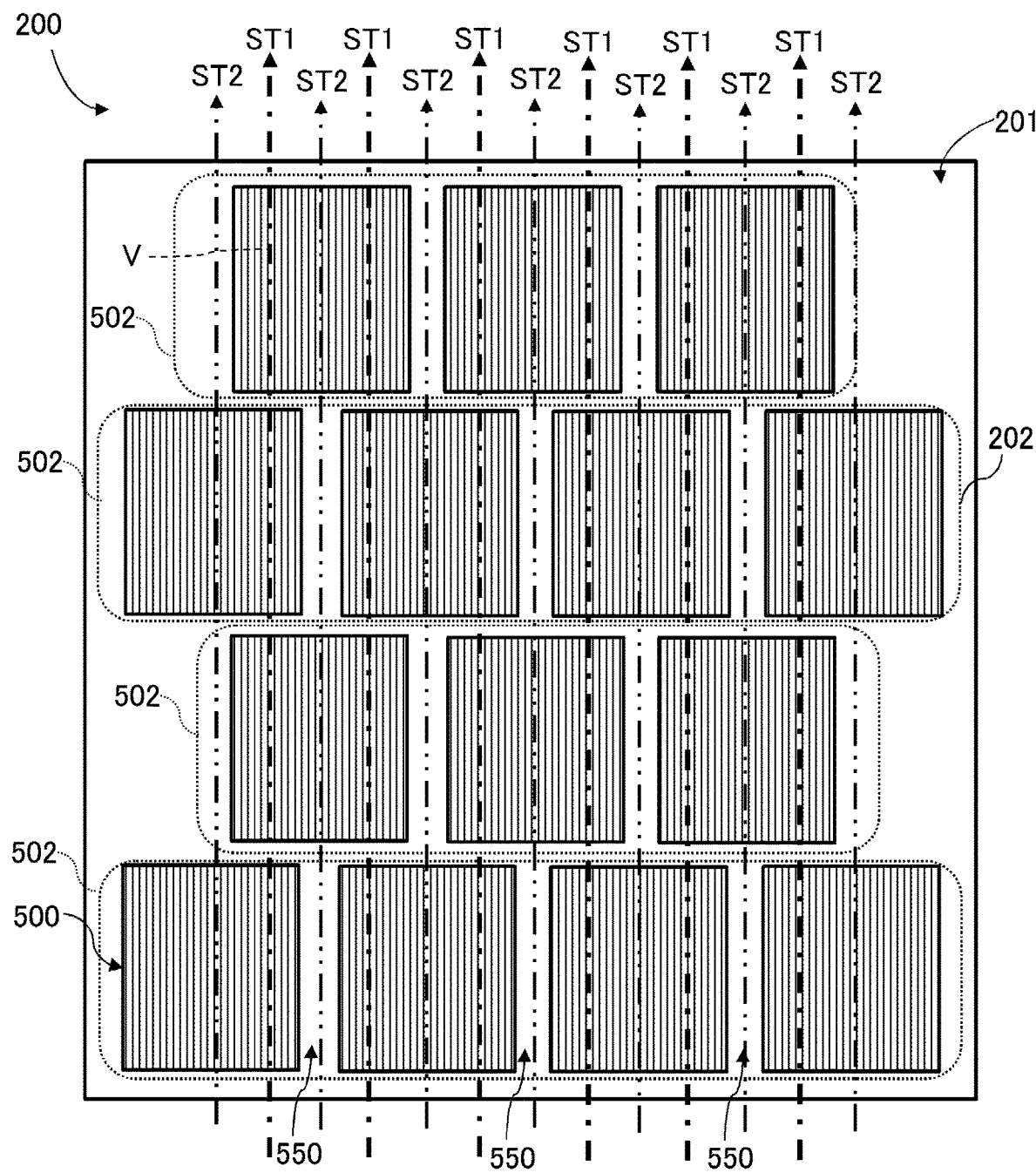
FIG. 14A is a schematic plan view of a surface-processed sheet according to a seventh modified example.
Figure 15A:
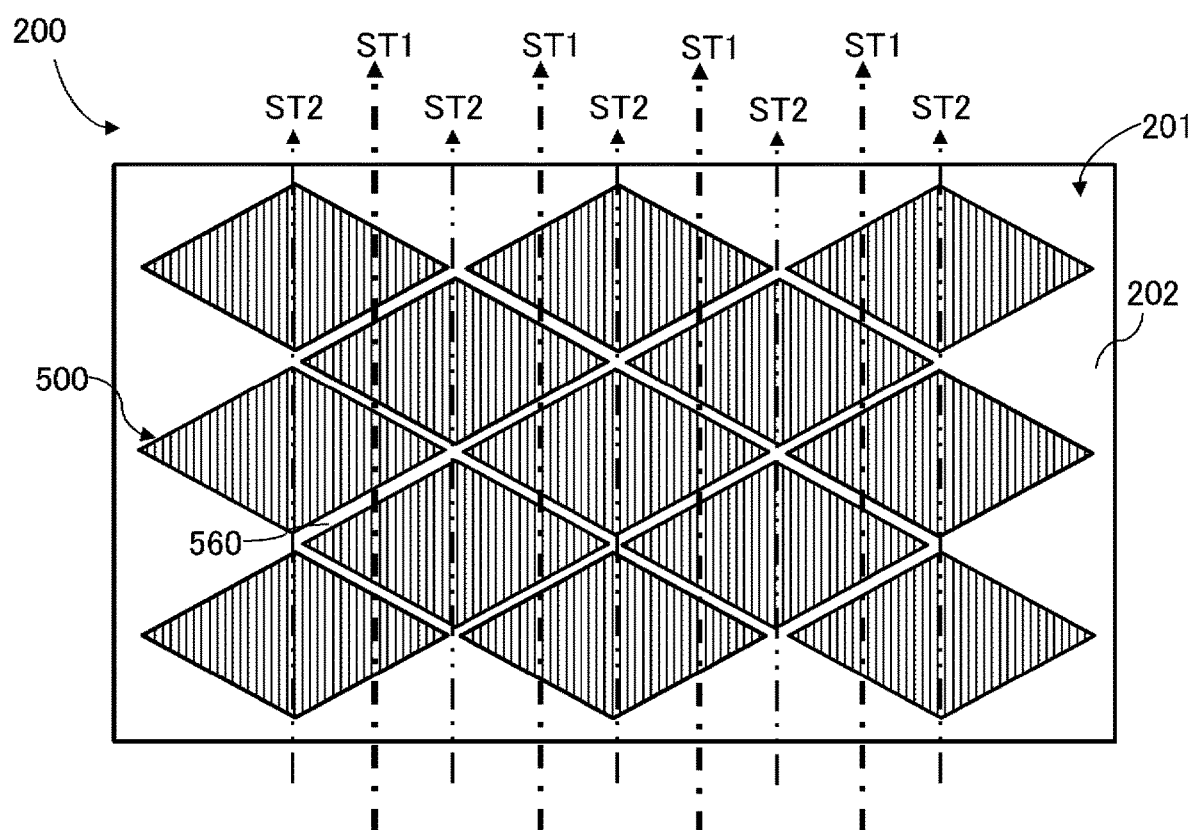
FIG. 15A is a schematic plan view of a surface-processed sheet according to an eleventh modified example.
Figure 15B:
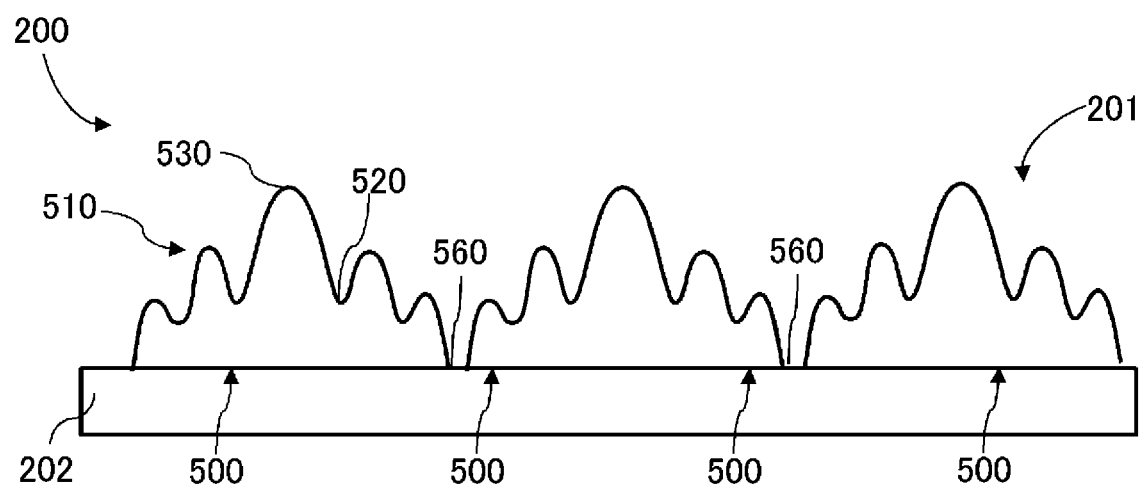
FIG. 15B is a schematic front view of a surface-processed sheet according to the eleventh modified example.

The plurality of blocks 500 may be arranged in a staggered manner as illustrated in the seventh modified example of FIG. 14A. In the present example, a plurality of blocks 500 constitute a plurality of block rows 502. Each of the plurality of block rows 502 includes two or more blocks 500 arranged side by side in the second direction. The plurality of block rows 502 are arranged side by side in the first direction. Among two of block rows 502 adjacent to each other in the first direction, one block row 502 is shifted from the other block row 502 in the second direction by half a block 500.

A plurality of inclined surfaces 510 of the plurality of the corresponding blocks 500 are arranged on one line V extending in the first direction as in the above-described embodiments. To be more specific, a line V passing through the left side portion or the right side portion of one block 500 passes through the right side portion or the left side portion of the block 500 included in each block row 502 in all the block rows 502 in a plan view as illustrated in FIG. 14A. That is, the line V passes through the inclined surface 510 of the block 500 in all the block rows 502 in a plan view.

The air flowing toward the surface-processed sheet 200 split into a plurality of mainstreams ST1 and a plurality of sub-streams ST2 as follows. The air directed to the left or right side portion of each block 500 flows in the first direction along the corresponding line V. At this time, the air continuously flows along the plurality of inclined surfaces 510, and thereby forming a plurality of mainstreams ST1. On the other hand, the other air flows in the first direction alternately through the central portions of the inclined surfaces 510 and the block clearances 550. Since the block clearance 550 is wider than the fine groove 520 as described above and the air vortex E is not generated in the block clearance 550, a plurality of sub-streams ST2 having a different flow rate from the mainstream ST1 are created.

Also in the seventh modified example (see FIG. 14A), since the plurality of mainstreams ST1 and the plurality of sub-streams ST2 are alternately arranged side by side in the second direction similarly to the above-described embodiments, the momentum of the air flow flowing in the first direction on the surface-processed sheet 200 spreads in the span direction. Therefore, the plurality of mainstreams ST1 and the plurality of sub-streams ST2 can smoothly and stably move in the first direction, and air can be blown accurately in the first direction at a higher speed.

Figure 14B:
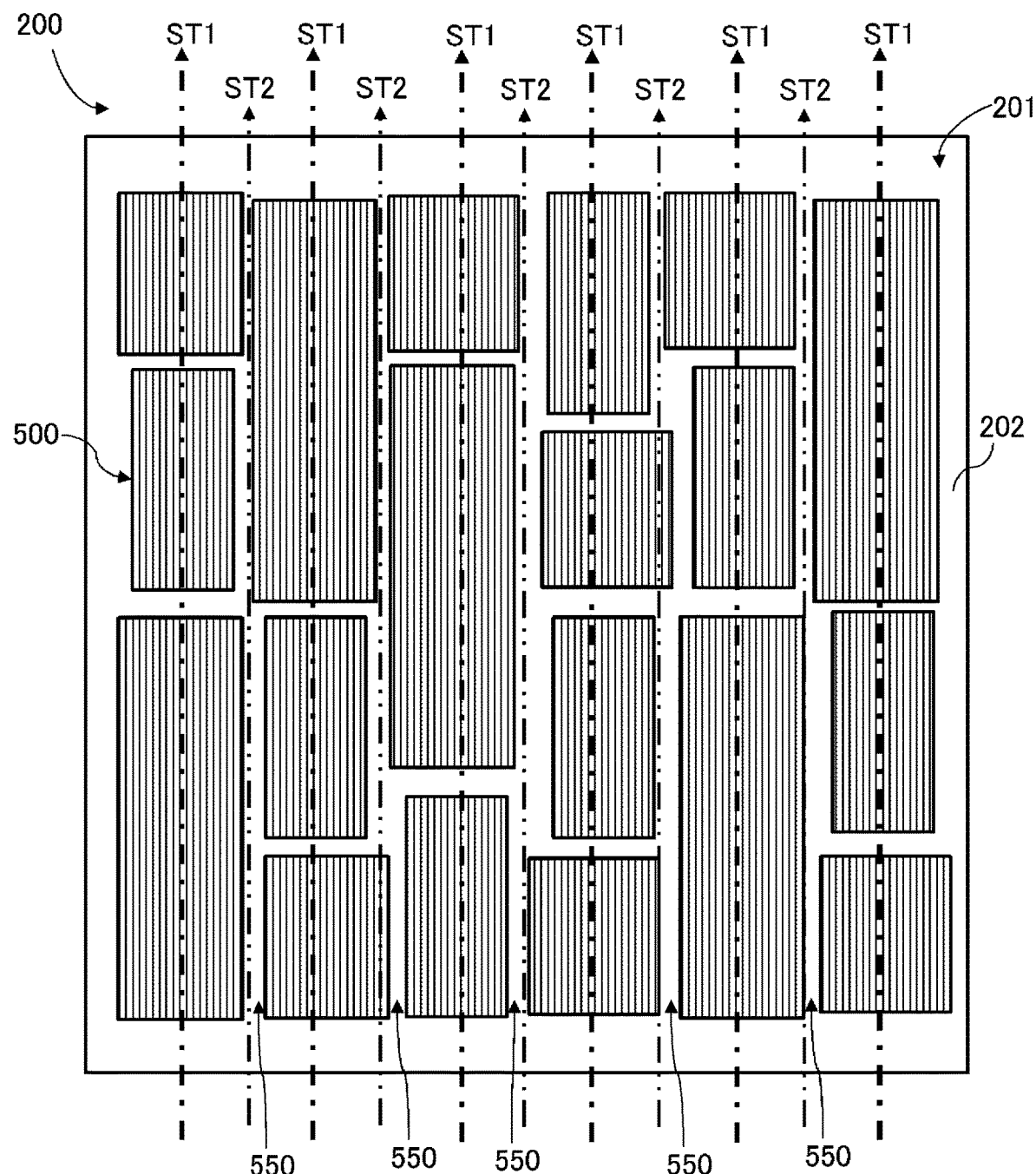
FIG. 14B is a schematic plan view of a surface-processed sheet according to an eighth modified example.

The plurality of blocks 500 may have a plurality of patterns of different shapes or may be randomly arranged as illustrated in the eighth modified example of FIG. 14B. In this case, the number and the range of the blocks 500 through which the line V passes differ depending on the position on the surface-processed sheet 200 in the second direction. When the air flows along the line V, if the number or the range of the blocks 500 through which the line V passes is large, the air flows smoothly to form the mainstream ST1. On the other hand, when the air flows along the line V, if the number or the range of the blocks 500 through which the line V passes is small, the sub-stream ST2 having a flow rate different from that of the mainstream ST1 is formed.

As described above, when the shape patterns of the plurality of blocks 500 are different or the plurality of blocks 500 are arranged at random, a plurality of mainstreams ST1 and a plurality of sub-streams ST2 are formed, and the formation positions of the mainstreams ST1 and the sub-streams ST2 vary in the second direction. Therefore, the plurality of mainstreams ST1 and the plurality of sub-streams ST2 can smoothly and stably move in the first direction, and air can be blown accurately in the first direction at a higher speed also in the eighth modified example (see FIG. 14B) as in the above-described embodiments.

Figure 14C:
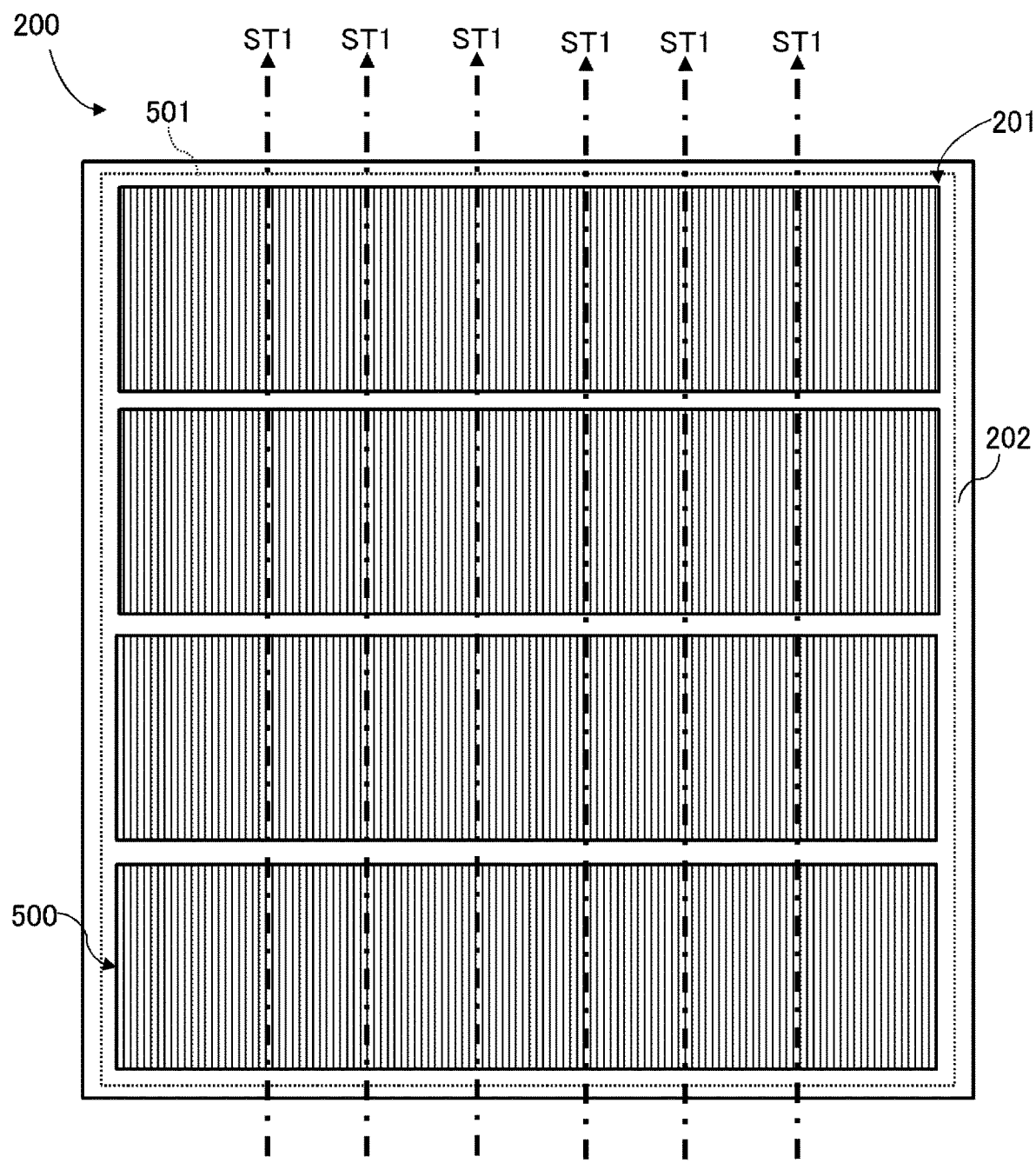
FIG. 14C is a schematic plan view of a surface-processed sheet according to a ninth modified example.

A plurality of blocks 500 that are long in the second direction may form one block column 501 arranged in the first direction as illustrated in the ninth modified example of FIG. 14C. In this case, the air flowing toward the surface-processed sheet 200 continuously flows along the inclined surfaces 510 of the plurality of the corresponding blocks 500 constituting a block column 501 to form the mainstream ST1 as a whole, and thus, air can be blown accurately in the first direction at a higher speed wind also in the ninth modified example (see FIG. 14C) as in the above-described embodiments.

Figure 14D:
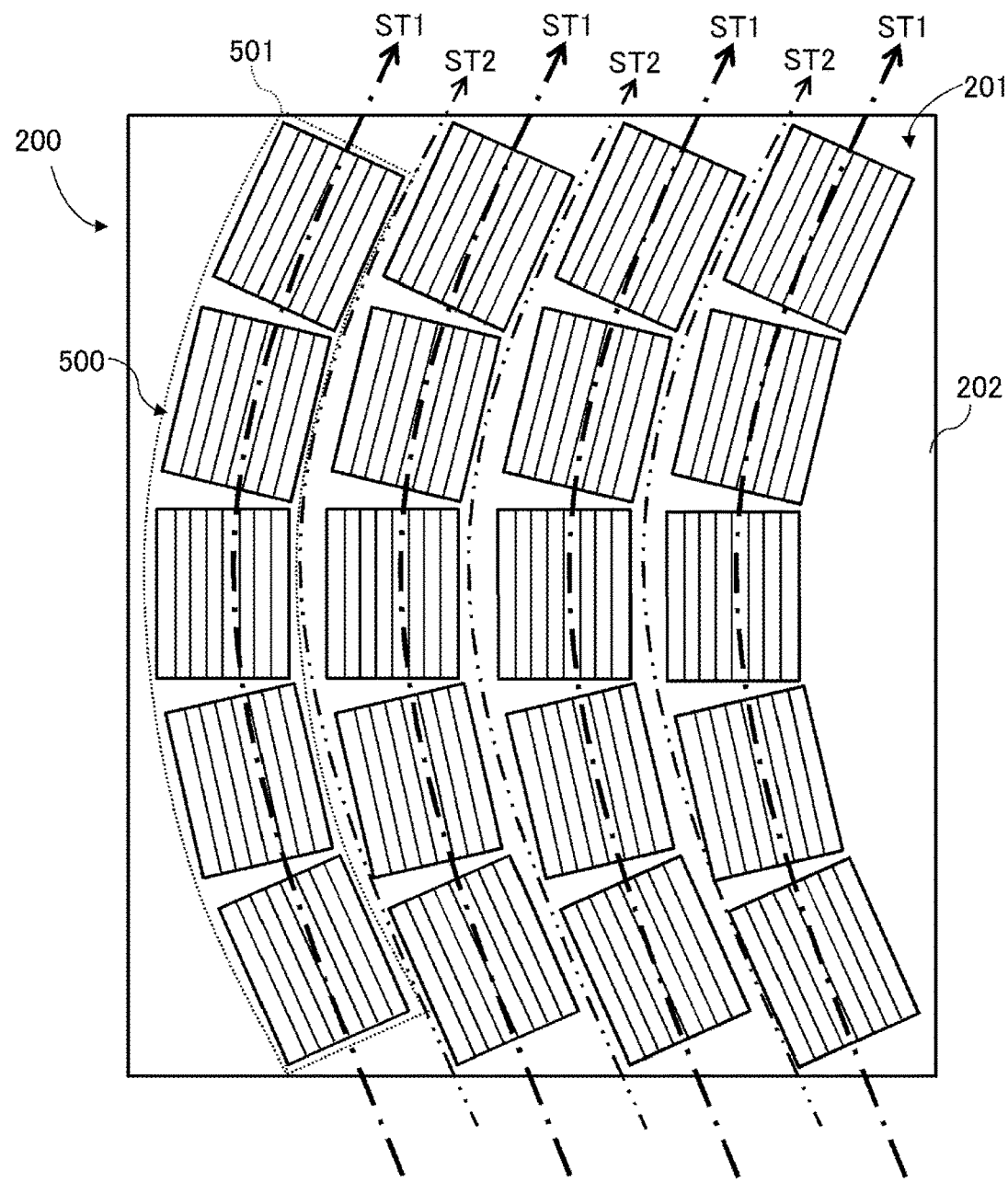
FIG. 14D is a schematic plan view of a surface-processed sheet according to a tenth modified example.

The first direction in which two or more blocks 500 constituting each block column 501 are arranged may extend in a curved shape as illustrated in the tenth modified example of FIG. 14D. That is, in each block column 501, two or more blocks 500 may be continuously arranged in a curved shape in a plan view. In this case, each block 500 may be arranged such that the front side thereof faces upstream in the first direction and the rear side thereof faces downstream in the first direction. Accordingly, in each block 500, the inclined surface 510 extends to be inclined upward in the first direction, and the plurality of fine grooves 520 extend substantially parallel to the first direction and linearly.

Also in the tenth modified example (see FIG. 14D), the air flowing toward the surface-processed sheet 200 split into a plurality of mainstreams ST1 and a plurality of sub-streams ST2 and flows in the first direction, and thus, the same effects as those of the above-described embodiments are achieved. In the present example, since the first direction is curved, the plurality of mainstreams ST1 and the plurality of sub-streams ST2 also flow in a curved shape. As described above, by using the function of the surface-processed structure 201 causing air to flow in a certain direction, air can be easily blown in a desired direction.

Each of the plurality of blocks 500 may have a diamond shape in a plan view, and these diamond-shaped blocks 500 may be arranged in a lattice pattern as illustrated in the eleventh modified example of FIG. 15A. A clearance 560 extending obliquely relative to the first direction and the second direction is formed between two blocks 500 adjacent to each other.

In this case, the number of blocks 500 through which the line V passes differs depending on the position on the surface-processed sheet 200 in the second direction. When the air flows along the line V, the number of blocks 500 through which the air passes is larger when the line V passes through the left side portion or the right side portion of the block 500 than when the line V passes through the central portion of the block 500.

Here, when the air flows over a certain distance, the greater the number of blocks 500 through which the air passes, the higher the flow rate of the air for the following reason. The greater the number of blocks 500 in a certain distance through which air flows, the greater the number of clearances 560 within that certain distance. When air flows through the clearance 560, contact resistance is less likely to occur in the air. That is, the air flowing through the clearance 560 easily moves without losing its flow rate.

In the eleventh modified example (see FIG. 15A), a plurality of mainstreams ST1 are formed by the air flowing through the left side portions or the right side portions of the blocks 500, and a plurality of sub-streams ST2 are formed by the air flowing through the central portions of the blocks 500. A plurality of mainstreams ST1 and a plurality of sub-streams ST2 are alternately arranged side by side in the second direction as in the above-described embodiments. Therefore, the plurality of mainstreams ST1 and the plurality of sub-streams ST2 can smoothly and stably move in the first direction, and air can be blown accurately in the first direction at a higher speed.

On the inclined surface 510 of the block 500, a plurality of fine grooves 520 may extend to be curved downward in a front view and may each have a shape in which the width becomes narrower downward as illustrated in FIG. 15B. A plurality of protruding portions 530 may extend to be curved upward in a front view and may each have a shape in which the width becomes narrower upward. The plurality of protruding portions 530 may have a larger upward protruding height as they are closer to the center in the second direction. Each of the plurality of protruding portions 530 has a shape in which the height increases toward downstream in the first direction. Even when such inclined surface 510 is configured in this manner, the same function as that of the inclined surfaces 510 in the above-described embodiments can be exhibited.

In the example of FIG. 15B, the apexes of the plurality of protruding portions 530 have relatively low surface roughness. The bottoms of the plurality of fine grooves 520 have relatively high surface roughness. Accordingly, the air flowing onto the inclined surface 510 can easily flow over the protruding portion 530 and hardly flow in the fine groove 520. Note that, also in the above-described embodiments and other modified examples, the surface roughness of the protruding portion 530 may be relatively low, or the surface roughness of the fine groove 520 may be relatively high.

Furthermore, the case where the fine groove 520 is provided on the inclined surface 510 of the block 500 is exemplified in the above-described embodiments. Alternatively, the block 500 need not have the inclined surface 510. The fine groove 520 need not be provided in the block 500. For example, the surface-processed structure 201 may include a plurality of first grooves arranged side by side in the second direction and a second groove that extends parallel to the first groove, is narrower than the first groove, and is shallower than the first groove. A plurality of second grooves may be aligned between adjacent first grooves. In this case, since the first groove functions similarly to the block clearance 550 and the second groove functions similarly to the fine groove 520, the friction reducing effect can be exhibited over a wide flow rate range of the inflowing air, as in the above-described embodiments.

According to the disclosure, it is possible to provide the following surface-processed structure, surface-processed sheet, and propeller fan.

(1) A surface-processed structure according to an aspect of the disclosure includes a plurality of blocks arranged side by side in a first direction parallel to a target surface, the plurality of blocks being three-dimensional objects arranged on the target surface, the target surface being a surface of a target object. Each of the plurality of blocks includes an inclined surface extending from upstream to downstream in the first direction with a distance from the target surface gradually increasing. A plurality of the inclined surfaces of the plurality of the corresponding blocks are arranged on one line extending in the first direction.

(2) In the surface-processed structure, the inclined surface is entirely exposed toward upstream in the first direction of the block, and a downstream end portion of the inclined surface in the first direction is located farthest away from the target surface in the block.

(3) In the surface-processed structure, two blocks of the plurality of blocks adjacent to each other in the first direction are an upstream block and a downstream block being downstream of the upstream block, and an upstream end portion of the inclined surface of the downstream block in the first direction is located closer to the target surface than a downstream end portion of the upstream block in the first direction.

(4) In the surface-processed structure, each of the plurality of blocks includes a plurality of fine grooves provided on the inclined surface, and the plurality of fine grooves are spaced apart from each other, are arranged side by side in a second direction orthogonal to the first direction, and extend from upstream to downstream in the first direction.

(5) In the surface-processed structure, the plurality of fine grooves extend from the upstream end portion to the downstream end portion of the inclined surface in the first direction.

(6) In the surface-processed structure, the plurality of blocks are two-dimensionally arrayed side by side in the first direction and the second direction, a block clearance having a groove shape and extending in a direction intersecting the second direction is formed between two blocks of the plurality of blocks adjacent to each other in the second direction, and a width of each of the plurality of fine grooves in the second direction is narrower than a width of the clearance in the second direction.

(7) In the surface-processed structure, the plurality of blocks are arranged to form a plurality of the clearances continuously arranged in the first direction, and the plurality of clearances constitute one fluid flow path extending in the first direction.

(8) A surface-processed structure according to an aspect of the disclosure includes a plurality of first grooves arranged in a second direction, and a second groove that extends parallel to the first groove, is narrower than the first groove, and is shallower than the first groove. A plurality of the second grooves are aligned between the adjacent first grooves.

(9) In the surface-processed structure, an aspect ratio of the first groove is lower than an aspect ratio of the second groove.

(10) A surface-processed sheet according to an aspect of the disclosure includes the surface-processed structure being provided on a base of the surface-processed sheet that can be installed on the target surface.

(11) A propeller fan according to an aspect of the disclosure includes a rotation shaft portion and a blade extending outward from the rotation shaft portion. The surface-processed structure is provided on a surface of the blade. The first direction is a direction from a leading edge toward a trailing edge of the blade.

The invention claimed is:
1. A surface-processed structure comprising:
a plurality of blocks, the plurality of blocks being three-dimensional objects arranged on a target surface, the target surface being a surface of a target object,
wherein the target surface extends in a first direction and a second direction orthogonal to each other,
the plurality of blocks is spaced apart from each other and is arranged side by side in the second direction,
each of the plurality of blocks includes a top face including a plurality of grooves,
the plurality of grooves is spaced apart from each other, is arranged side by side in the second direction, and extends from upstream to downstream in the first direction, a block clearance having a groove shape and extending in the first direction is formed between two blocks of the plurality of blocks, the two blocks being adjacent to each other in the second direction, a width of each of the plurality of grooves in the second direction is less than a width of the block clearance in the second direction, both end portions of the top face in the second direction are located above bottom portions of the plurality of grooves in a cross section of each of the plurality of blocks extending along a plane perpendicular to the first direction, and each of the plurality of grooves extends at a constant depth from an upstream end portion to a downstream end portion of an inclined surface in the first direction.

2. The surface-processed structure according to claim 1, wherein the top face includes a plurality of protruding portions each provided between two grooves of the plurality of grooves that are adjacent to each other, an outer surface of each of the plurality of blocks comprises top end surfaces of the plurality of protruding portions, and both end portions of the top face in the second direction are located at a height identical to a height of the outer surface.

3. The surface-processed structure according to claim 1, wherein the width of each of the plurality of grooves in the second direction is greater than a width of each of the plurality of protruding portions in the second direction.

4. The surface-processed structure according to claim 2, wherein the plurality of protruding portions includes two first protruding portions and a plurality of second protruding portions different from the two first protruding portions, and the both end portions of the top face in the second direction comprise the two first protruding portions and a width of each of the two first protruding portions in the second direction is equal to or greater than a width of each of the plurality of second protruding portions in the second direction.

5. The surface-processed structure according to claim 1, wherein the width of the block clearance in the second direction is less than a sum of widths of the plurality of grooves in the second direction.

6. The surface-processed structure according to claim 1, wherein each of the plurality of grooves is arranged at a first pitch corresponding to a first flow rate that is a relatively higher flow rate of two different flow rates, and each of a plurality of block clearances, including the block clearance, is arranged at a second pitch corresponding to a second flow rate that is a relatively slower flow rate of the two different flow rates.

7. The surface-processed structure according to claim 1, wherein the top face is an inclined surface extending from the upstream to the downstream in the first direction with a distance from the target surface gradually increasing.

8. A surface-processed structure comprising:
a plurality of blocks, the plurality of blocks being three-dimensional objects arranged on a target surface, the target surface being a surface of a target object, wherein the target surface extends in a first direction and a second direction orthogonal to each other, the plurality of blocks is spaced apart from each other and is arranged side by side in the second direction, each of the plurality of blocks includes a top face including a plurality of grooves, the plurality of grooves is spaced apart from each other, is arranged side by side in the second direction, and extends from upstream to downstream in the first direction, a block clearance having a groove shape and extending in the first direction is formed between two blocks of the plurality of blocks, the two blocks being adjacent to each other in the second direction, a width of each of the plurality of grooves in the second direction is less than a width of the block clearance in the second direction, both end portions of the top face in the second direction are located above bottom portions of the plurality of grooves in a cross section of each of the plurality of blocks extending along a plane perpendicular to the first direction, an aspect ratio indicating a ratio of a depth to a width in the second direction of the block clearance gradually increases from the upstream to the downstream in the first direction, the aspect ratio of the block clearance at an upstream end portion is 0.5 or less, and the aspect ratio of the block clearance at a downstream end portion is 0.7 or more.

9. The surface-processed structure according to claim 1, wherein the plurality of blocks is two-dimensionally arrayed side by side in the first direction and the second direction, and is arranged in such a manner that a plurality of block clearances, including the block clearance, forms a fluid flow path extending in a straight line along the first direction, and each set, among sets of the plurality of grooves, is provided on the top face and a plurality of the fluid flow paths is aligned alternately along the second direction.

10. The surface-processed structure according to claim 1, wherein a clearance having a groove shape and extending in the second direction is formed between two blocks of the plurality of blocks, the two blocks being adjacent to each other in the first direction, and a height difference of the top face of a block, among the two blocks, located upstream in the first direction of the two blocks is substantially equal to a width of the clearance having the groove shape in the first direction.

11. A surface-processed sheet comprising
the surface-processed structure according to claim 1 being provided on a base of the surface-processed sheet configured to be installed on the target surface.

* * * * *